(12) United States Patent
Kim et al.

(10) Patent No.: US 12,727,039 B2
(45) Date of Patent: Sep. 1, 2026

(54) EFFICIENT TERMINAL DATA COLLECTION

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 401 days.

(21) Appl. No.: 18/553,716

(22) PCT Filed: Apr. 4, 2022

(86) PCT No.: PCT/KR2022/004782
§ 371 (c)(1),
(2) Date: Oct. 2, 2023

(87) PCT Pub. No.: WO2022/215974
PCT Pub. Date: Oct. 13, 2022

(65) Prior Publication Data

US 2024/0188150 A1 Jun. 6, 2024

(30) Foreign Application Priority Data

Apr. 5, 2021 (KR) ........................ 10-2021-0044254
Jan. 24, 2022 (KR) ........................ 10-2022-0010158

(51) Int. Cl.
*H04W 76/10* (2018.01)

(52) U.S. Cl.
CPC .................................. *H04W 76/10* (2018.02)

(58) Field of Classification Search
CPC .................................................... H04W 76/10

(Continued)

(56) References Cited

U.S. PATENT DOCUMENTS

2019/0356558 A1 11/2019 Han et al.
2021/0368576 A1* 11/2021 Kim ..................... H04W 76/25

(Continued)

FOREIGN PATENT DOCUMENTS

WO 2019160377 8/2019

OTHER PUBLICATIONS

3GPP TS23.288 v17.0.0, 3rd Generation Partnership Project; Technical Specification Group Services and System Aspects; Architecture enhancement for 5G System (5GS) to support network data analytics services (Release 17), Mar. 2021 (Year: 2021).*

(Continued)

*Primary Examiner* — Nicholas R Taylor
*Assistant Examiner* — Chong G Kim
(74) *Attorney, Agent, or Firm* — LEE, HONG, DEGERMAN, KANG & WAIMEY

(57) ABSTRACT

A disclosure of the present disclosure provides a method of providing wireless communication by a session management function (SMF). The method comprises the steps of: receiving a protocol data unit (PDU) session establishment request message from a user equipment (UE), wherein the PDU session establishment request message comprises information indicating that the UE supports a user plane connection establishment request for UE data collection; in response to the PDU session establishment request message, transmitting a PDU session establishment approval message to the UE; receiving, from a network node, a message for making a request so that the UE establishes a user plane connection for UE data collection; and transmitting, to the UE, the user plane connection establishment request message for the UE data collection.

7 Claims, 16 Drawing Sheets

(58) Field of Classification Search
USPC .......................................................... 370/329
See application file for complete search history.

(56) References Cited

U.S. PATENT DOCUMENTS

2022/0124160 A1* 4/2022 Shariat .................... H04W 8/20
2022/0256396 A1* 8/2022 Hu ........................ H04W 76/32
2022/0394655 A1* 12/2022 Shreevastav ............ H04W 4/12
2023/0239361 A1* 7/2023 Zhou ..................... H04L 67/141
709/228
2023/0336969 A1* 10/2023 Muñoz De La Torre Alonso .......
H04W 24/08
2023/0362592 A1* 11/2023 Edge ..................... H04W 76/15

OTHER PUBLICATIONS

PCT International Application No. PCT/KR2022/004782, International Search Report dated Jun. 27, 2022, 2 pages.
3rd Generation Partnership Project (3GPP), "Technical Specification Group and System Aspects; Architecture enhancements for 5G System (5GS) to support network analytics services (Release 17)," 3GPP TS 23.288 V17.0.0, Mar. 2021, 157 pages.
3rd Generation Partnership Project (3GPP), "Technical Specification Group and System Aspects; Procedures for the 5G System (5GS); Stage 2 (Release 17)," 3GPP TS 23.502 V17.0.0, Mar. 2021, 637 pages.
Qualcomm Incorporated et al., "New procedure for data from UE," 3GPP TSG-WG SA2 Meeting #143E e-meeting, S2-2101346, Mar. 2021, 6 pages.

* cited by examiner

Figure 1:
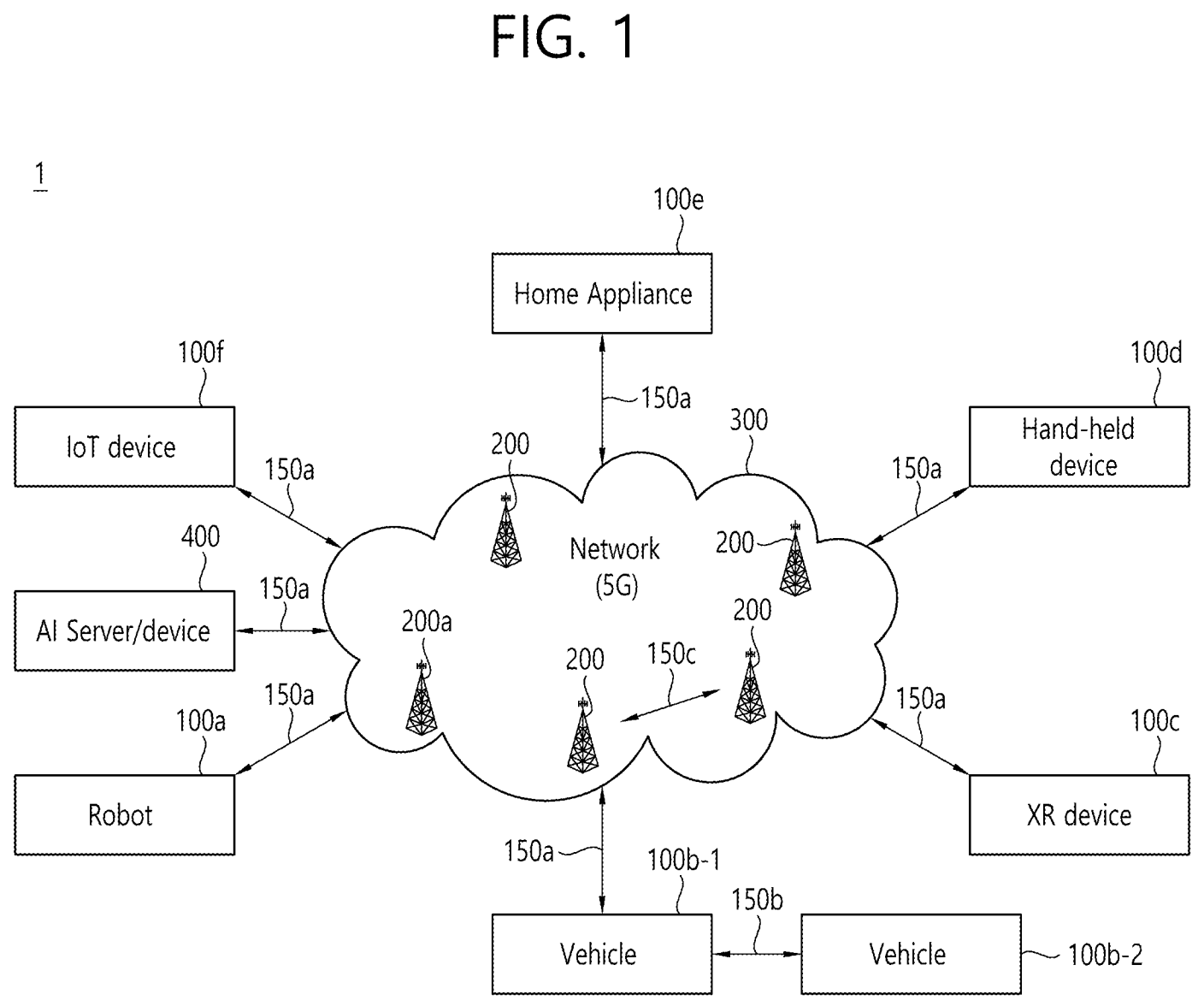

IoT device
100f
AI Server/device
400
Robot
100a
150a
150a
150a
Home Appliance
100e
150a
Network
(5G)
300
200
200
200
200
200a
150c
Hand-held device
100d
150a
XR device
100c
150a
Vehicle
100b-1
150a
Vehicle
100b-2
150b

FIG. 2

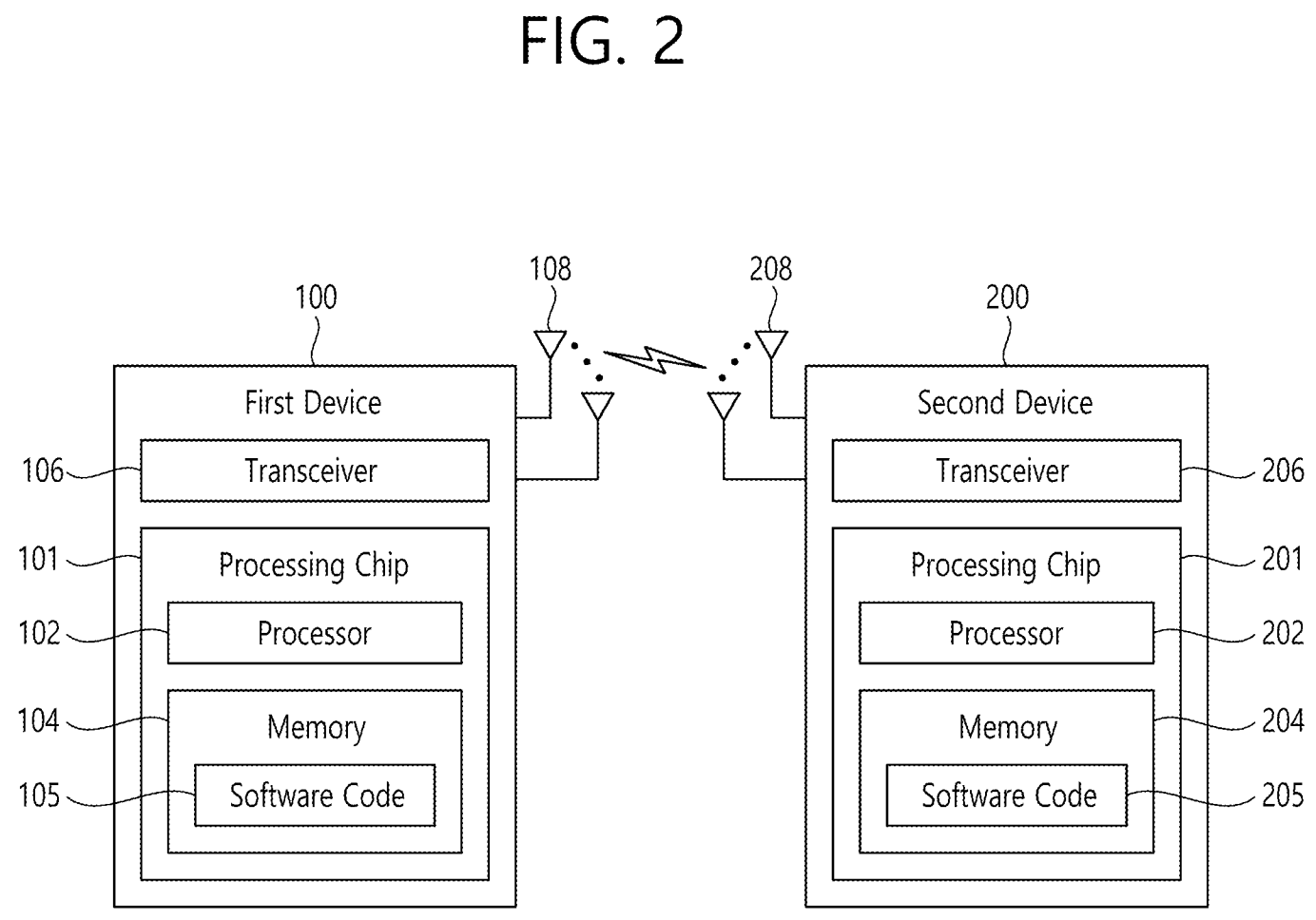

100
First Device
Transceiver
Processing Chip
Processor
Memory
Software Code
106
101
102
104
105
108

200
Second Device
Transceiver
Processing Chip
Processor
Memory
Software Code
206
201
202
204
205
208

FIG. 7

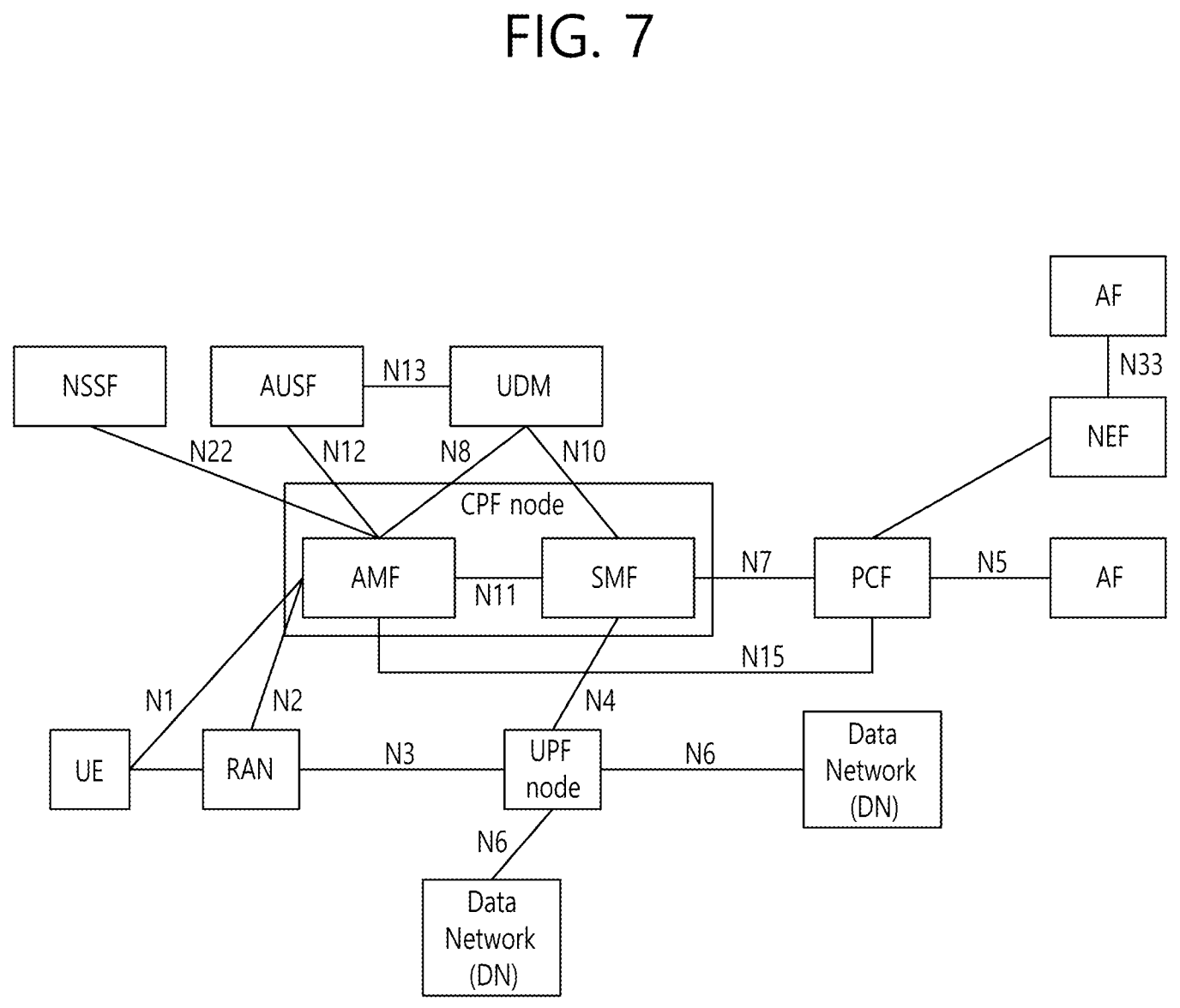

AF
N33
NEF
AF
N5
PCF
N7
N15
Data Network (DN)
N6
CPF node
SMF
AMF
N11
N10
N8
UDM
N13
AUSF
N12
N22
NSSF
N4
UPF node
N6
Data Network (DN)
N3
N2
RAN
N1
UE

Figure 10:
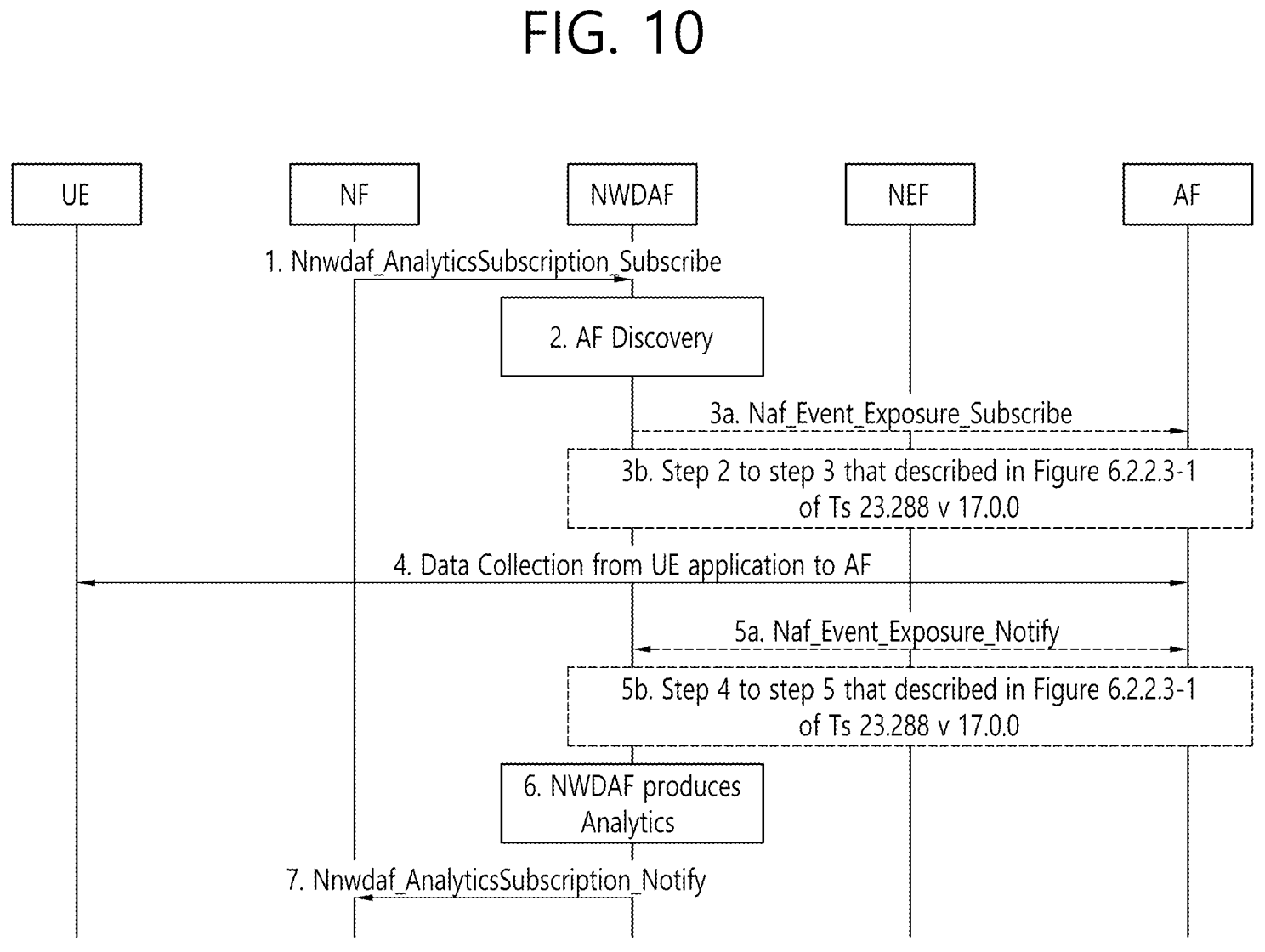

NWDAF

NEF

AF

1. Nnwdaf_AnalyticsSubscription_Subscribe

2. AF Discovery

3a. Naf_Event_Exposure_Subscribe

3b. Step 2 to step 3 that described in Figure 6.2.2.3-1 of Ts 23.288 v 17.0.0

4. Data Collection from UE application to AF

5a. Naf_Event_Exposure_Notify

5b. Step 4 to step 5 that described in Figure 6.2.2.3-1 of Ts 23.288 v 17.0.0

6. NWDAF produces Analytics

7. Nnwdaf_AnalyticsSubscription_Notify

FIG. 14

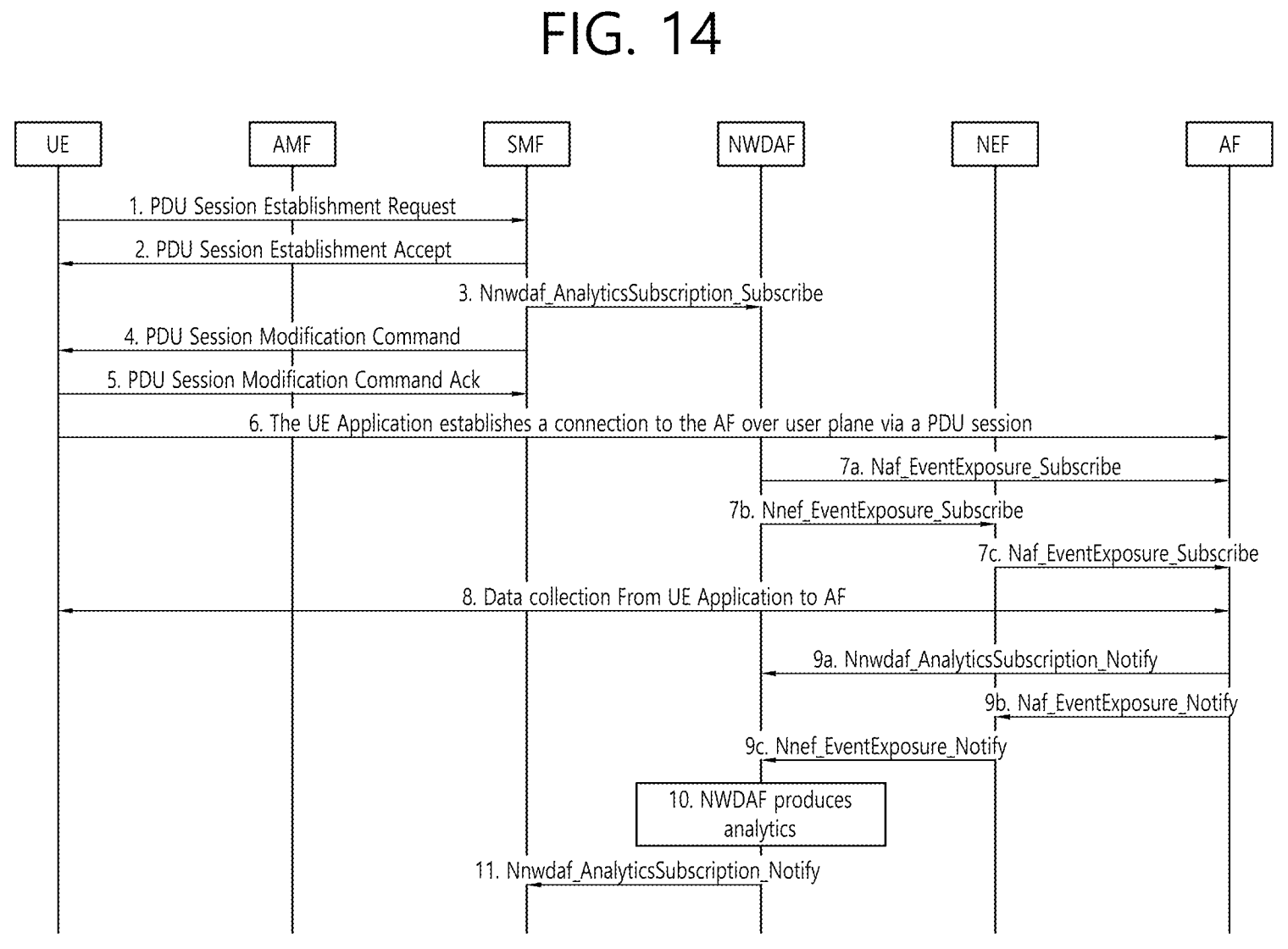

UE
AMF
SMF
NWDAF
NEF
AF

1. PDU Session Establishment Request
2. PDU Session Establishment Accept
3. Nnwdaf_AnalyticsSubscription_Subscribe
4. PDU Session Modification Command
5. PDU Session Modification Command Ack
6. The UE Application establishes a connection to the AF over user plane via a PDU session
7a. Naf_EventExposure_Subscribe
7b. Nnef_EventExposure_Subscribe
7c. Naf_EventExposure_Subscribe
8. Data collection From UE Application to AF
9a. Nnwdaf_AnalyticsSubscription_Notify
9b. Naf_EventExposure_Notify
9c. Nnef_EventExposure_Notify
10. NWDAF produces analytics
11. Nnwdaf_AnalyticsSubscription_Notify

EFFICIENT TERMINAL DATA COLLECTION

CROSS-REFERENCE TO RELATED APPLICATION(S)

This application is the National Stage filing under 35 U.S.C. 371 of International Application No. PCT/KR2022/004782, filed on Apr. 4, 2022, which claims the benefit of earlier filing date and right of priority to Korean Application Nos. 10-2021-0044254, filed on Apr. 5, 2021, and 10-2022-0010158, filed on Jan. 24, 2022, the contents of which are all incorporated by reference herein in their entirety.

TECHNICAL FIELD

The present specification relates to mobile communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NWDAF collects data from applications of the terminal through a user plane connection between AF and the terminal. In the past, there was no information about the trigger to create the user plane connection.

SUMMARY

A trigger for user plane connection between AF and the terminal is required for a terminal that requires data collection.

The SMF can form a user plane connection by receiving a message requesting a user plane connection for a terminal that needs to collect data from a network node and transmitting the message to the terminal.

The present specification may have various effects.

For example, through the method disclosed in the present specification, a user plane connection with AF is formed only for UEs that need data collection, it is possible to prevent inefficiency in which a UE that does not need data collection forms a user plane connection with the AF.

The claims set in the present specification may be combined in various ways. For example, the technical features of the method claims of this specification may be combined to implement a device, and the technical features of the device claims of this specification may be combined to implement a method. Additionally, the technical features of the method claims of this specification and the technical features of the device claims may be combined to implement a device, and the technical features of the method claims of this specification and technical features of the device claims may be combined to implement a method. Other implementations are within the scope of the following claims.

BRIEF DESCRIPTION OF THE DRAWINGS

FIG. 1 shows an example of a communication system to which implementations of the present disclosure is applied.

FIG. 2 shows an example of wireless devices to which implementations of the present disclosure is applied.

FIG. 7 is an example diagram showing an architecture for supporting simultaneous access to two data networks.

FIG. 10 shows the data collection procedure from the terminal.

FIG. 14 shows the procedure of the fourth embodiment.

FIG. 15 is a flowchart showing the procedures performed by a SMF.

FIG. 16 is a flowchart showing the procedures performed by a UE.

DETAILED DESCRIPTION

Figure 3:
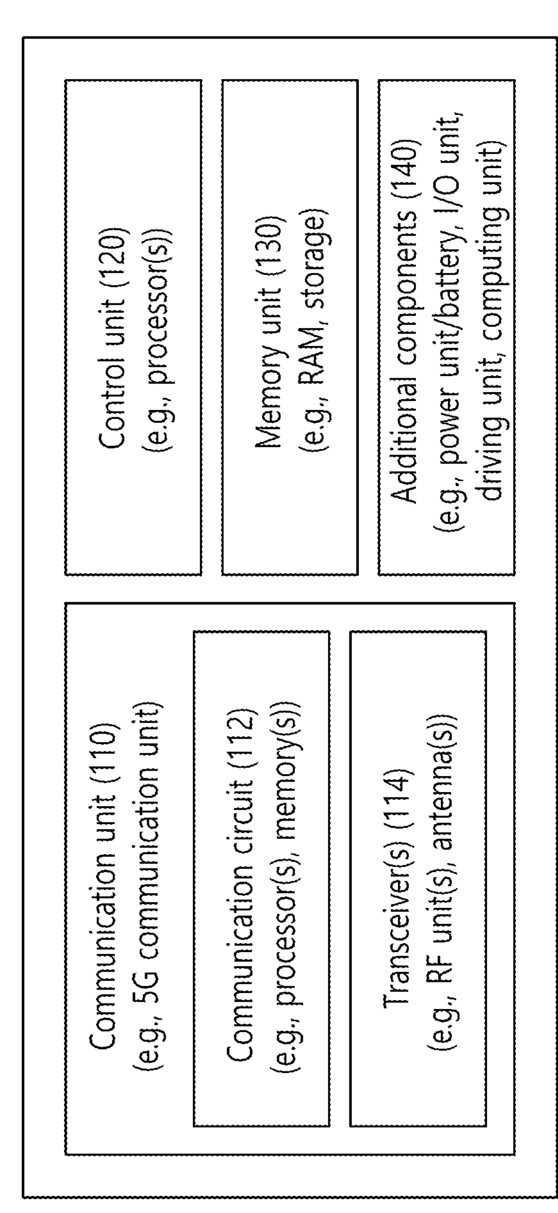
FIG. 3 shows an example of a wireless device to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. Evolution of 3GPP LTE includes LTE-A (advanced), LTE-A Pro, and/or 5G NR (new radio).

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

In the attached drawings, a UE (User Equipment) is shown as an example, but the illustrated UE may also be referred to by terms such as terminal, ME (mobile equipment), etc. Additionally, the UE may be a portable device such as a laptop, mobile phone, PDA, smart phone, or multimedia device, or it may be a non-portable device such as a PC or vehicle-mounted device.

Hereinafter, UE is used as an example of a wireless communication device (or wireless device, or wireless device) capable of wireless communication. Operations performed by the UE may be performed by a wireless communication device. Wireless communication devices may also be referred to as wireless devices, wireless devices, etc. Hereinafter, AMF may refer to an AMF node, SMF may refer to an SMF node, and UPF may refer to a UPF node.

The term base station used below generally refers to a fixed station that communicates with wireless devices, including eNodeB (evolved-NodeB), eNB (evolved-NodeB), BTS (Base Transceiver System), and access point (Access Point), gNB (Next generation NodeB), etc.

I. TECHNOLOGIES AND PROCEDURES APPLICABLE TO THE DISCLOSURE OF THIS SPECIFICATION

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Some use cases may require multiple categories for optimization, while other use cases may focus on only one key performance indicator (KPI). 5G supports these diverse use cases using flexible and reliable methods.

eMBB goes far beyond basic mobile Internet access and covers rich interactive work and media and entertainment applications in the cloud and augmented reality. Data is one of the core drivers of 5G, and for the first time in the 5G era, dedicated voice services may not be provided. In 5G, voice processing is expected to be simplified as an application utilizing the data connection provided by the communication system. The main reasons for the increase in traffic are the increase in the size of content and the increase in applications requiring high data transfer rates. As more devices connect to the Internet, streaming services (audio and video), interactive video, and mobile Internet access will become more widely available. Many of these applications require an always-on connection to push real-time information and alerts for users. Cloud storage and applications are rapidly growing in mobile communication platforms and can be applied to both work and entertainment. Cloud storage is a special use case that accelerates the increase in uplink data transmission rates. 5G is also used for remote work in the cloud. When using haptic interfaces, 5G requires much lower end-to-end latency to maintain a good user experience. For example, entertainment such as cloud gaming and video streaming is another key factor driving the demand for mobile broadband capabilities. Smartphones and tablets are essential for entertainment in all places, including high-mobility environments such as trains, cars, and airplanes. Other use cases include augmented reality for entertainment and information retrieval. In this case, augmented reality requires very low latency and instantaneous data volumes.

Additionally, one of the most anticipated 5G use cases involves the ability to seamlessly connect embedded sensors across all sectors, or mMTC. Potentially, the number of internet-of-things (IOT) devices is expected to reach 240 million by 2020. Industrial IoT plays one of the key roles in enabling smart cities, asset tracking, smart utilities, agriculture, and security infrastructure through 5G.

URLLC includes ultra-reliable, low-latency links to autonomous vehicles and new services that will transform the industry through remote control of primary infrastructure. Reliability and latency are essential to control smart grids, automate industry, achieve robotics, and control and coordinate drones.

5G is a means of delivering streaming rated at hundreds of megabits per second at gigabits per second, and can complement fiber-to-the-home (FTTH) and cable-based broadband (or DOCSIS). Such high speeds are needed to deliver not only virtual reality and augmented reality, but also TVs with resolutions of 4K and higher (6K, 8K and higher). Virtual reality (VR) and augmented reality (AR) applications include highly immersive sports games. Certain applications may require special network configurations. For example, for VR games, gaming companies must integrate core servers with network operators' edge network servers to minimize latency.

Automotive is expected to become a significant new motivating force in 5G, with many examples of use cases for in-vehicle mobile communications. For example, entertainment for passengers requires broadband mobile communications with high concurrent capacity and high mobility. This is because in the future, users will continue to expect high-quality connections regardless of location and speed. Another example of use in the automotive field is an AR dashboard. The AR dashboard allows the driver to identify objects in the dark other than those visible from the front window, and displays the distance to the object and the movement of the object by overlapping information delivery to the driver. In the future, wireless modules will enable communication between vehicles, information exchange between vehicles and supporting infrastructure, and information exchange between vehicles and other connected devices, such as those accompanying pedestrians. Safety systems reduce the risk of accidents by guiding drivers through alternative courses of action to help them drive more safely. The next step will be remotely controlled or autonomous vehicles. This requires very high reliability and very fast communication between different autonomous vehicles and between vehicles and infrastructure. In the future, autonomous vehicles will perform all driving activities and drivers will only focus on traffic that the vehicle cannot identify. The technical requirements of autonomous vehicles require ultra-low latency and ultra-high reliability to increase traffic safety to levels that cannot be achieved by humans.

Smart cities and smart homes/buildings, referred to as smart societies, will be embedded in high-density wireless sensor networks. A distributed network of intelligent sensors will identify conditions for cost-effective and energy-efficient maintenance of a city or home. A similar configuration can be performed for each household. All temperature sensors, window and heating controllers, burglar alarms, and home appliances will be connected wirelessly. Many of these sensors typically have low data rates, power, and cost. However, real-time HD video may be required by certain types of devices for monitoring purposes.

Automated control of distribution sensor networks is required to achieve a higher degree of decentralization of energy consumption and distribution, including heat and gas. Smart grid uses digital information and communication technology to collect information and connect sensors to operate according to the collected information. Because this information can include the behavior of supply companies and consumers, smart grids can improve the distribution of fuels such as electricity by way of efficiency, reliability, economics, production sustainability, automation, and more. Smart grid can also be considered as another low-latency sensor network.

Mission-critical applications (e.g. e-health) are one of the 5G usage scenarios. The health section includes many applications that benefit from mobile communications. Communications systems can support telemedicine, providing clinical care in remote locations. Telemedicine can help reduce barriers to distance and improve access to health services that are not consistently available in remote rural areas. Telemedicine is also used in emergency situations to perform critical care and save lives. Mobile communication-based wireless sensor networks can provide remote monitoring and sensors for parameters such as heart rate and blood pressure.

Wireless and mobile communications are becoming increasingly important in industrial applications. Wiring is expensive to install and maintain. Therefore, the possibility of replacing cables with reconfigurable wireless links is an attractive opportunity for many industries. However, to achieve this replacement, wireless connections must be established with latency, reliability, and capacity similar to cables, and management of wireless connections needs to be simplified. When 5G connectivity is required, low latency and very low error probability are the new requirements.

Logistics and cargo tracking are important examples of mobile communications that enable inventory and package tracking from anywhere using location-based information systems. Logistics and freight use cases typically require low data rates but require location information with wide range and reliability.

Referring to FIG. 1, the communication system 1 includes wireless devices **100*a* to 100*f*, base stations (BSs) 200, and a network 300. Although FIG. 1 illustrates a 5G network as an example of the network of the communication system 1**, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices **100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400**. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc.

The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 KHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean “sub 6 GHz range”, FR2 may mean “above 6 GHz range,” and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IOT) technology for low-power communication as well as LTE, NR and 6G. For example, NB-IOT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas 108 and 208 may be a plurality of physical antennas or a plurality of logical antennas (e.g., antenna ports).

The one or more transceivers 106 and 206 may convert received user data, control information, radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the one or more transceivers 106 and 206 can up-convert OFDM baseband signals to OFDM signals by their (analog) oscillators and/or filters under the control of the one or more processors 102 and 202 and transmit the up-converted OFDM signals at the carrier frequency. The one or more transceivers 106 and 206 may receive OFDM signals at a carrier frequency and down-convert the OFDM signals into OFDM baseband signals by their (analog) oscillators and/or filters under the control of the one or more processors 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory unit 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory unit 130 may be configured by a RAM, a DRAM, a ROM, a flash memory, a volatile memory, a non-volatile memory, and/or a combination thereof.

Figure 4:
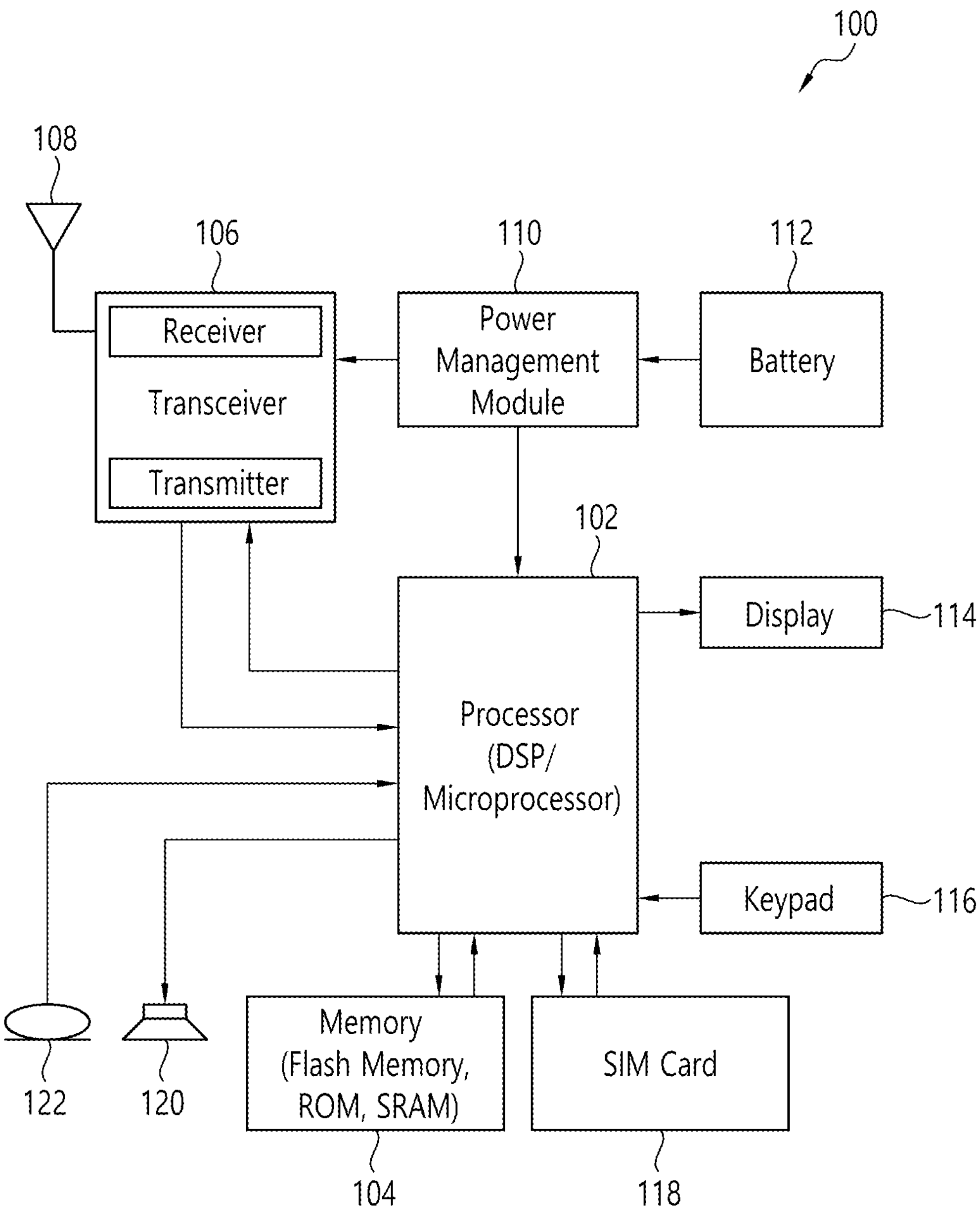
FIG. 4 shows an example of UE to which implementations of the present disclosure is applied.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 116 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 5:
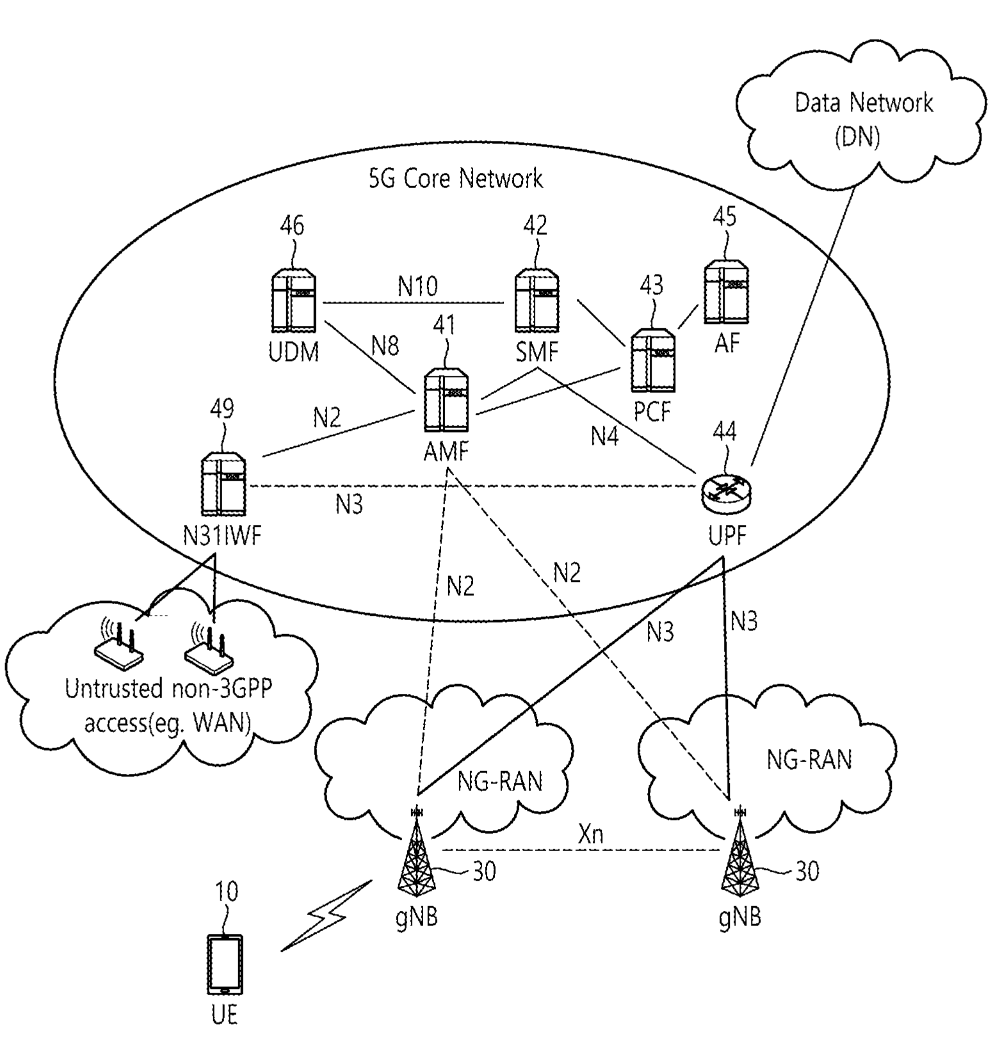
FIG. 5 is a structural diagram of a next-generation mobile communication network.

FIG. 5 is a structural diagram of a next-generation mobile communication network.

5GC (5G Core) may include various components, and in FIG. 5, some of them are AMF (Access and Mobility Management Function) 410 and SMF (Session Management Function) 410. Function) (420), PCF (Policy Control Function) (430), UPF (User Plane Function) (440), AF (Application Function) (450), UDM (Unified Data Management: Includes Unified Data Management (460) and N3IWF (Non-3GPP (3rd Generation Partnership Project) Inter Working Function) (490).

The UE 100 is connected to a data network via the UPF 440 through a Next Generation Radio Access Network (NG-RAN) including the gNB 20.

The UE 100 may also receive data services through untrusted non-3GPP access, for example, a wireless local area network (WLAN). To connect the non-3GPP access to the core network, N3IWF 490 may be deployed.

The illustrated N3IWF 490 performs the function of managing interworking between non-3GPP access and 5G systems. If the UE 100 is connected to a non-3GPP access (e.g., WiFi, referred to as IEEE 801.11), the UE 100 may be connected to the 5G system through the N3IWF 490. The N3IWF (490) performs control signaling with the AMF (410) and is connected to the UPF (440) through the N3 interface for data transmission.

The depicted AMF 410 can manage access and mobility in 5G systems. AMF 410 can perform the function of managing Non-Access Stratum (NAS) security. AMF 410 may perform a function of handling mobility in an idle state.

The illustrated UPF 440 is a type of gateway through which user data is transmitted and received. The UPF node 440 can perform all or part of the user plane functions of the Serving Gateway (S-GW) and Packet Data Network Gateway (P-GW) of 4th generation mobile communication.

The UPF 440 operates as a boundary point between the next generation radio access network (NG-RAN) and the core network and is an element that maintains the data path between the gNB 20 and the SMF 420. Additionally, when the UE 100 moves across the area served by the gNB 20, the UPF 440 serves as a mobility anchor point. The UPF 440 may perform the function of handling PDUs. For mobility within NG-RAN (Next Generation-Radio Access Network defined after 3GPP Release-15), UPF packets can be routed. Additionally, UPF 440 may be configured to support other 3GPP networks (RAN defined before 3GPP Release-15, e.g., UTRAN, Evolved-Universal Mobile Telecommunications System (UMTS) Terrestrial Radio Access Network (E-UTRAN)) or GERAN (GSM (It may also function as an anchor point for mobility with the Global System for Mobile Communication (EDGE)/Enhanced Data rates for Global Evolution (EDGE) Radio Access Network). UPF 440 may correspond to the termination point of the data interface toward the data network.

The illustrated PCF (430) is a node that controls the operator's policy.

The illustrated AF 450 is a server for providing various services to the UE 100.

The illustrated UDM 460 is a type of server that manages subscriber information, such as the Home Subscriber Server (HSS) of 4th generation mobile communication. The UDM 460 stores and manages the subscriber information in a Unified Data Repository (UDR).

The illustrated SMF 420 may perform the function of allocating an IP (Internet Protocol) address of the UE. Additionally, the SMF 420 can control a protocol data unit (PDU) session.

For reference, hereinafter AMF (410), SMF (420), PCF (430), UPF (440), AF (450), UDM (460), N3IWF (490), gNB (20), or UE (100) Reference symbols for may be omitted.

5th generation mobile communication supports multiple numerologies or subcarrier spacing (SCS) to support various 5G services. For example, if SCS is 15 kHz, it supports wide area in traditional cellular bands, and if SCS is 30 KHz/60 kHz, it supports dense-urban, lower latency. And it supports a wider carrier bandwidth, and when the SCS is 60 kHz or higher, it supports a bandwidth greater than 24.25 GHz to overcome phase noise.

Figure 6:
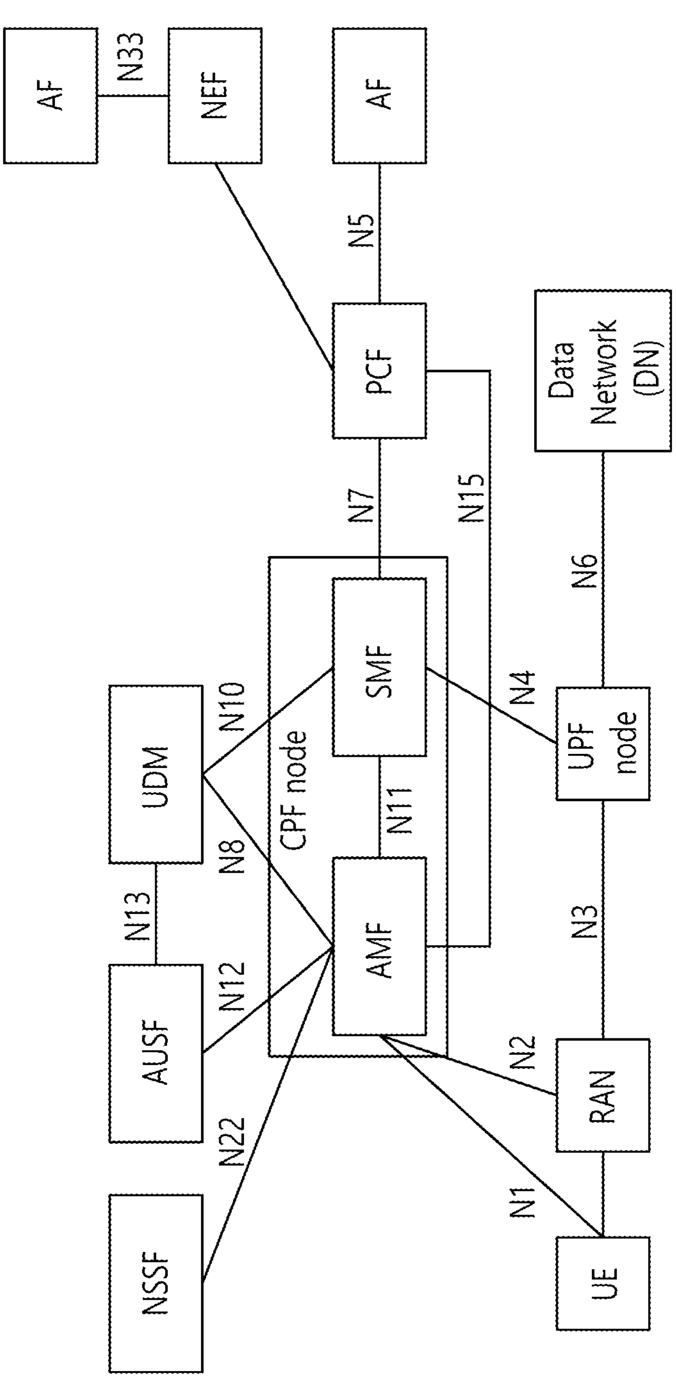
FIG. 6 is an example diagram showing the expected structure of next-generation mobile communication from a node perspective.

FIG. 6 is an example diagram showing the expected structure of next-generation mobile communication from a node perspective.

As can be seen with reference to FIG. 6, the UE is connected to a data network (DN) through a next-generation Radio Access Network (RAN).

The control plane function (CPF) node shown is all or part of the functions of the Mobility Management Entity (MME) of 4th generation mobile communication, and the control plane functions of Serving Gateway (S-GW) and PDN Gateway (P-GW). Perform all or part of The CPF node includes an Access and Mobility Management Function (AMF) and a Session Management Function (SMF).

The illustrated User Plane Function (UPF) node is a type of gateway through which user data is transmitted and received. The UPF node can perform all or part of the user plane functions of S-GW and P-GW of 4th generation mobile communication.

The illustrated PCF (Policy Control Function) is a node that controls the operator's policy.

The illustrated Application Function (AF) is a server for providing various services to the UE.

The illustrated Unified Data Management (UDM) is a type of server that manages subscriber information, like the Home Subscriber Server (HSS) of 4th generation mobile communication. The UDM stores and manages the subscriber information in a Unified Data Repository (UDR).

The depicted Authentication Server Function (AUSF) authenticates and manages the UE.

The network slice selection function (NSSF) shown is a node for network slicing as will be described later.

The Network Exposure Function (NEF) shown is a node that provides a mechanism to safely expose the services and functions of the 5G core. For example, NEF exposes functions and events, securely provides information from external applications to the 3GPP network, translates internal and external information, provides control plane parameters, and provides Packet Flow Description (PFD)) can be managed.

In FIG. 7, a UE can access two data networks simultaneously using multiple PDU (protocol data unit or packet data unit) sessions.

FIG. 7 is an example diagram showing an architecture for supporting simultaneous access to two data networks.

FIG. 7 shows an architecture for a UE to simultaneously access two data networks using one PDU session.

The reference points shown in FIGS. 6 and 7 are as follows.

N1 represents a reference point between UE and AMF.

N2 represents a reference point between (R)AN and AMF.

N3 represents a reference point between (R)AN and UPF.

N4 represents the reference point between SMF and UPF.

N5 represents the reference point between PCF and AF.

N6 represents the reference point between UPF and DN.

N7 represents the reference point between SMF and PCF.

N8 represents a reference point between UDM and AMF.

N9 represents a reference point between UPFs.

N10 represents a reference point between UDM and SMF.

N11 represents a reference point between AMF and SMF.

N12 represents the reference point between AMF and AUSF.

N13 represents the reference point between UDM and AUSF.

N14 represents a reference point between AMFs.

N15 represents the reference point between the PCF and the AMF in a non-roaming scenario, and the reference point between the AMF and the PCF of the visited network in the roaming scenario.

N16 represents a reference point between SMFs.

N22 represents a reference point between AMF and NSSF.

N30 represents the reference point between PCF and NEF.

N33 represents the reference point between AF and NEF.

For reference, in FIGS. 6 and 7, AF by a third party other than the operator can be connected to 5GC through NEF.

<PDU Session Establishment Procedure>

A PDU session establishment procedure is described. Section 4.3.2 of 3GPP TS 23.502 V16.3.0 (2019-12) can be referred.

Figure 8:
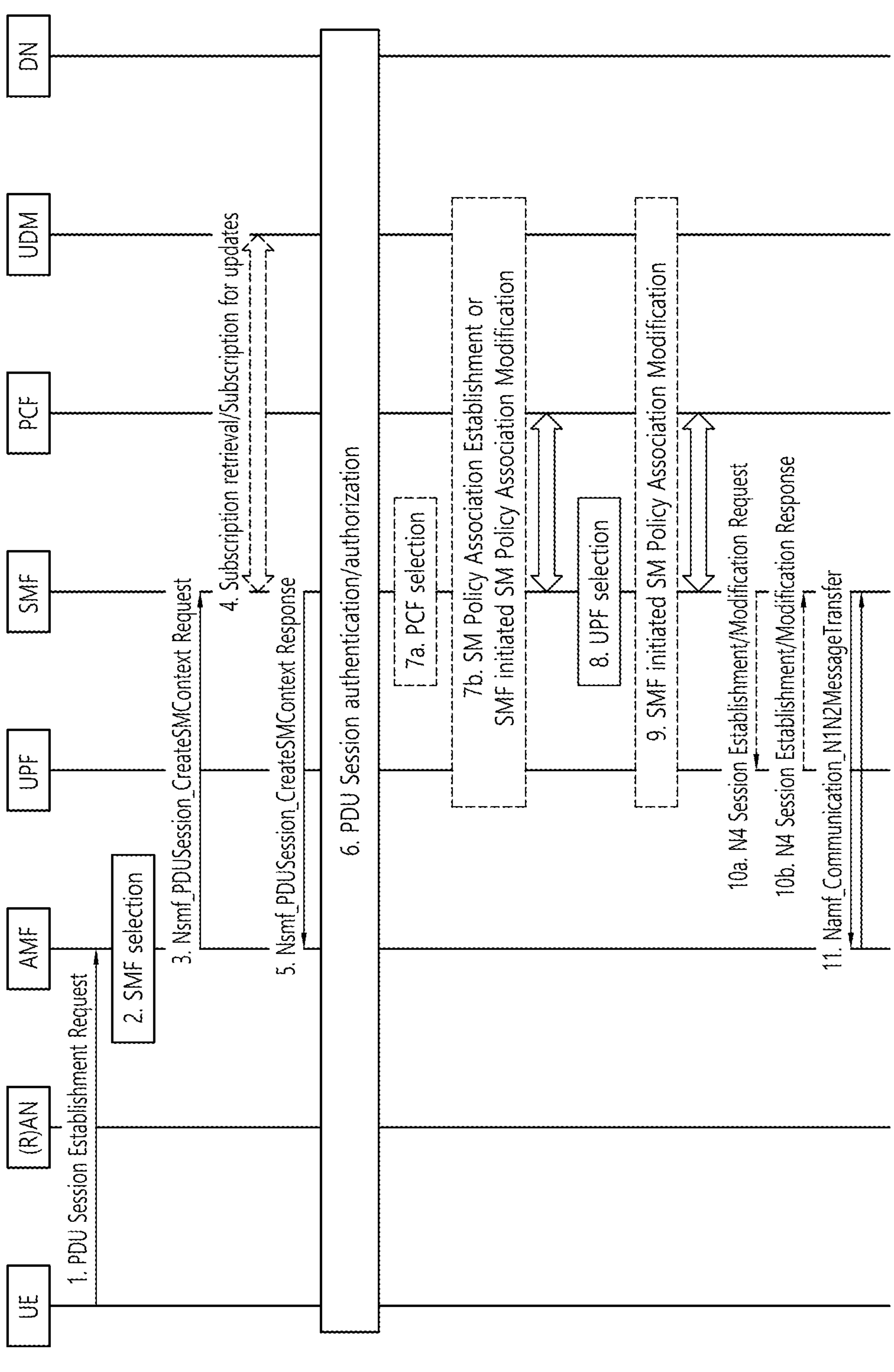
FIGS. 8 and 9 show an example of a PDU session establishment procedure to which implementations of the present disclosure is applied.
Figure 9:
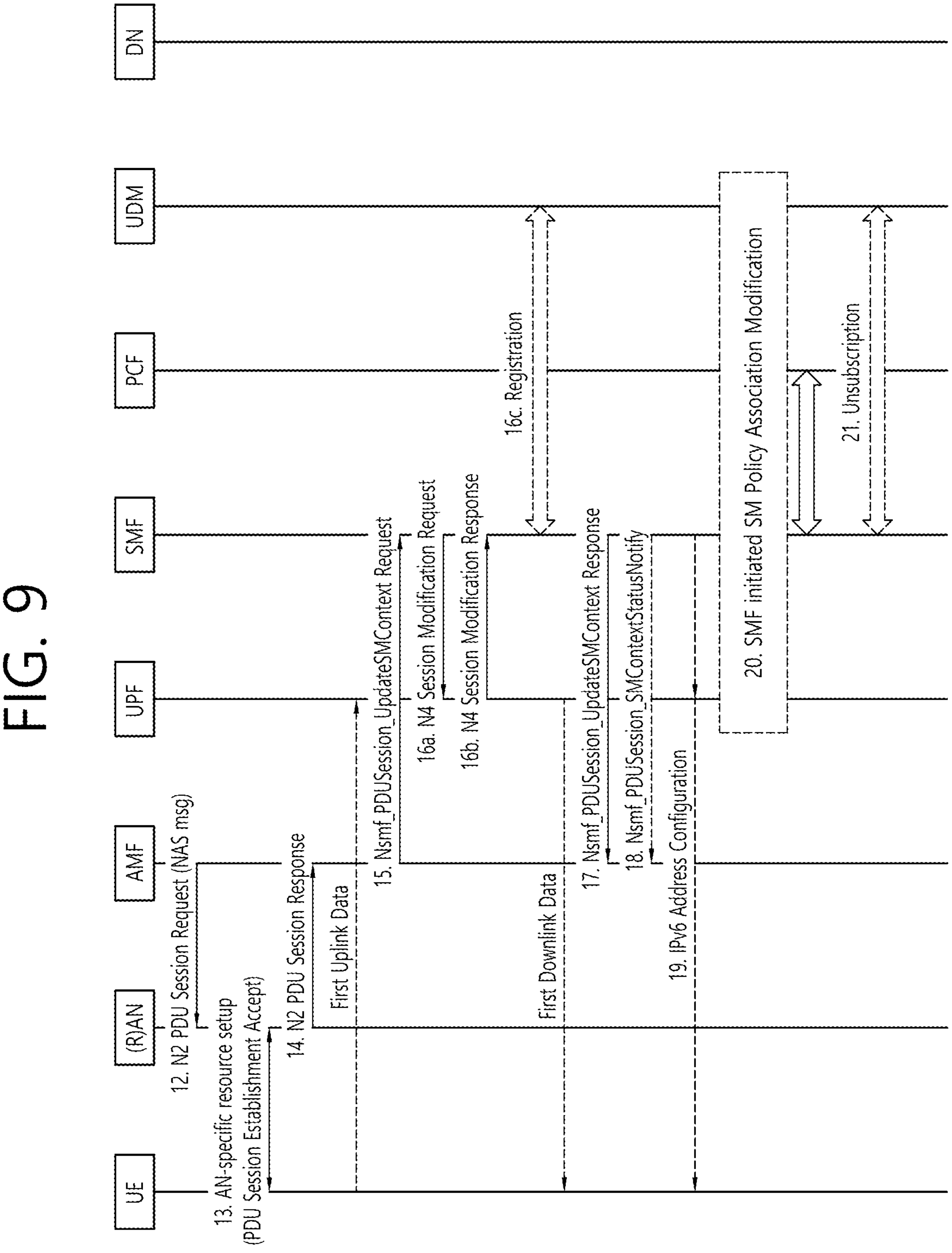

FIGS. 8 and 9 show an example of a PDU session establishment procedure to which implementations of the present disclosure is applied.

A PDU session establishment may correspond to:

a UE initiated PDU session establishment procedure.

a UE initiated PDU session handover between 3GPP and non-3GPP.

a UE initiated PDU session handover from EPS to 5GS.

a network triggered PDU session establishment procedure.

A PDU session may be associated either (a) with a single access type at a given time, i.e., either 3GPP access or non-3GPP access, or (b) simultaneously with multiple access types, i.e., one 3GPP access and one non-3GPP access. A PDU session associated with multiple access types is referred to as multi access PDU (MA PDU) session and it may be requested by access traffic steering, switching, splitting (ATSSS)-capable UEs.

FIGS. 8 and 9 specify the procedures for establishing PDU sessions associated with a single access type at a given time.

The procedure shown in FIGS. 8 and 9 assumes that the UE has already registered on the AMF thus unless the UE is emergency registered the AMF has already retrieved the user subscription data from the UDM.

First, procedures of FIG. 8 are described.

(1) Step 1: In order to establish a new PDU session, the UE generates a new PDU session ID.

The UE initiates the UE requested PDU session establishment procedure by the transmission of a NAS message containing a PDU Session Establishment Request message within the N1 SM container. The PDU Session Establishment Request message includes a PDU session ID, Requested PDU Session Type, a Requested session and service continuity (SSC) mode, 5GSM Capability, protocol configuration options (PCO), SM PDU DN Request Container, UE Integrity Protection Maximum Data Rate, etc.

The Request Type indicates "Initial request" if the PDU session establishment is a request to establish a new PDU session and indicates "Existing PDU Session" if the request refers to an existing PDU session switching between 3GPP access and non-3GPP access or to a PDU session handover from an existing packet data network (PDN) connection in EPC. The Request Type indicates "Emergency Request" if the PDU session establishment is a request to establish a PDU session for emergency services. The Request Type indicates "Existing Emergency PDU Session" if the request refers to an existing PDU session for emergency services switching between 3GPP access and non-3GPP access or to a PDU session handover from an existing PDN connection for emergency services in EPC.

The UE includes the S-NSSAI from the Allowed NSSAI of the current access type. If the Mapping of Allowed NSSAI was provided to the UE, the UE shall provide both the S-NSSAI of the visited PLMN (VPLMN) from the Allowed NSSAI and the corresponding S-NSSAI of the HPLMN from the Mapping Of Allowed NSSAI.

(2) Step 2: The AMF selects an SMF. If the Request Type indicates "Initial request" or the request is due to handover from EPS or from non-3GPP access serving by a different AMF, the AMF stores an association of the S-NSSAI(s), the data network name (DNN), the PDU session ID, the SMF ID as well as the Access Type of the PDU session.

If the Request Type is "initial request" and if the Old PDU session ID indicating the existing PDU session is also contained in the message, the AMF selects an SMF and stores an association of the new PDU Session ID, the S-NSSAI(s), the selected SMF ID as well as Access Type of the PDU Session.

If the Request Type indicates "Existing PDU Session", the AMF selects the SMF based on SMF-ID received from UDM. The AMF updates the Access Type stored for the PDU session.

If the Request Type indicates "Existing PDU Session" referring to an existing PDU session moved between 3GPP access and non-3GPP access, then if the serving PLMN S-NSSAI of the PDU session is present in the Allowed NSSAI of the target access type, the PDU session establishment procedure can be performed in the following cases:

the SMF ID corresponding to the PDU session ID and the AMF belong to the same PLMN;

the SMF ID corresponding to the PDU session ID belongs to the HPLMN:

Otherwise the AMF shall reject the PDU session establishment request with an appropriate reject cause.

The AMF shall reject a request coming from an emergency registered UE and the Request Type indicates neither "Emergency Request" nor "Existing Emergency PDU Session".

(3) Step 3: If the AMF does not have an association with an SMF for the PDU session ID provided by the UE (e.g., when Request Type indicates "initial request"), the AMF invokes Create SM Context Request procedure (e.g., Nsmf_PDUSession_CreateSMContext Request). If the AMF already has an association with an SMF for the PDU session ID provided by the UE (e.g., when Request Type indicates "existing PDU Session"), the AMF invokes Update SM Context Request procedure (e.g., Nsmf_PDUSession_UpdateSMContext Request).

The AMF sends the S-NSSAI of the serving PLMN from the Allowed NSSAI to the SMF. For roaming scenario in local breakout (LBO), the AMF also sends the corresponding S-NSSAI of the HPLMN from the Mapping Of Allowed NSSAI to the SMF.

The AMF ID is the UE's GUAMI which uniquely identifies the AMF serving the UE.

The AMF forwards the PDU session ID together with the N1 SM container containing the PDU Session Establishment Request message received from the UE. The generic public subscription identifier (GPSI) shall be included if available at AMF.

The AMF provides the PEI instead of the SUPI when the UE in limited service state has registered for emergency services without providing a SUPI. In case the UE in limited service state has registered for Emergency services with a SUPI but has not been authenticated, the AMF indicates that the SUPI has not been authenticated. The SMF determines that the UE has not been authenticated when it does not receive a SUPI for the UE or when the AMF indicates that the SUPI has not been authenticated.

The AMF may include a PCF ID in the Nsmf_PDUSession_CreateSMContext Request. This PCF ID identifies the home PCF (H-PCF) in the non-roaming case and the visited PCF (V-PCF) in the LBO roaming case.

(4) Step 4: If session management subscription data for corresponding SUPI, DNN and S-NSSAI of the HPLMN is not available, then SMF may retrieve the session management subscription data from the UDM and subscribes to be notified when this subscription data is modified.

(5) Step 5: The SMF transmits either Create SM Context Response message (e.g., Nsmf_PDUSession_CreateSMContext Response) or Update SM Context Response message (e.g., Nsmf_PDUSession_UpdateSMContext Response) to the AMF, depending on the request received in step 3.

If the SMF received Nsmf_PDUSession_CreateSMContext Request in step 3 and the SMF is able to process the PDU session establishment request, the SMF creates an SM context and responds to the AMF by providing an SM Context ID.

When the SMF decides to not accept to establish a PDU session, the SMF rejects the UE request via NAS SM signaling including a relevant SM rejection cause by responding to the AMF with Nsmf_PDUSession_CreateSMContext Response. The SMF also indicates to the AMF that the PDU session ID is to be considered as released, the SMF proceeds to step 20 below and the PDU session establishment procedure is stopped.

(6) Step 6: Optional secondary authentication/authorization may be performed.

(7a) Step 7a: If dynamic policy and charging control (PCC) is to be used for the PDU session, the SMF may perform PCF selection.

(7b) Step 7b: The SMF may perform an SM Policy Association Establishment procedure to establish an SM Policy association with the PCF and get the default PCC rules for the PDU session.

(8) Step 8: The SMF selects one or more UPFs.

(9) Step 9: The SMF may perform an SMF initiated SM Policy Association Modification procedure to provide information on the policy control request trigger condition(s) that have been met.

(10) Step 10: If Request Type indicates "initial request", the SMF may initiate an N4 Session Establishment procedure with the selected UPF. Otherwise, the SMF may initiate an N4 Session Modification procedure with the selected UPF In step 10a, the SMF may send an N4 Session Establishment/Modification Request to the UPF and provides packet detection, enforcement and reporting rules to be installed on the UPF for this PDU session. In step 10b, the UPF may acknowledge by sending an N4 Session Establishment/Modification Response.

(11) Step 11: The SMF transmits a N1N2Message Transfer message (e.g., Namf_Communication_N1N2MessageTransfer) to the AMF.

The N1N2Message Transfer message may include N2 SM information. The N2 SM information carries information that the AMF shall forward to the (R)AN which may include:

- The CN Tunnel Info: Core network address(es) of the N3 tunnel corresponding to the PDU session;
- One or multiple quality of service (QOS) profiles and the corresponding QoS flow IDs (QFIs);
- The PDU session ID: indicate to the UE the association between (R)AN resources and a PDU session for the UE.
- S-NSSAI with the value for the serving PLMN (i.e., the HPLMN S-NSSAI or, in LBO roaming case, the VPLMN S-NSSAI).
- User Plane Security Enforcement information determined by the SMF.
- If the User Plane Security Enforcement information indicates that integrity protection is "Preferred" or "Required", the SMF also includes the UE Integrity Protection Maximum Data Rate as received in the PDU Session Establishment Request message.
- Redundancy sequence number (RSN) parameter The N1N2Message Transfer message may include N1 SM container. The N1 SM container contains the PDU Session Establishment Accept message that the AMF shall provide to the UE. The PDU Session Establishment Accept message includes S-NSSAI from the Allowed NSSAI. For LBO roaming scenario, the PDU Session Establishment Accept message includes the S-NSSAI from the Allowed NSSAI for the VPLMN and also it includes the corresponding S-NSSAI of the HPLMN from the Mapping Of Allowed NSSAI that SMF received in step 3.

Multiple QOS Rules, QOS flow level, QoS parameters if needed for the QoS Flow(s) associated with those QoS rule(s) and QoS Profiles may be included in the PDU Session Establishment Accept message within the N1 SM container and in the N2 SM information.

If the PDU session establishment failed anywhere between step 5 and step 11, then the N1N2Message Transfer message shall include the N1 SM container with a PDU Session Establishment Reject message and shall not include any N2 SM information. The (R)AN sends the NAS message containing the PDU Session Establishment Reject message to the UE. In this case, steps 12-17 are skipped.

(12) Step 12: The AMF sends the NAS message containing PDU Session ID and PDU Session Establishment Accept message targeted to the UE and the N2 SM information received from the SMF within the N2 PDU Session Request message to the (R)AN.

(13) Step 13: The (R)AN may issue AN specific signaling exchange with the UE that is related with the information received from SMF. For example, in case of a NG-RAN, an RRC connection reconfiguration may take place with the UE establishing the necessary NG-RAN resources related to the QoS rules for the PDU session request received in step 12.

The (R)AN forwards the NAS message (PDU Session ID, N1 SM container (PDU Session Establishment Accept message)) provided in step 12 to the UE. The (R)AN shall only provide the NAS message to the UE if the AN specific signaling exchange with the UE includes the (R)AN resource additions associated to the received N2 command.

If the N2 SM information is not included in the step 11, then the following steps 14 to 16b and step 17 are omitted.

Now, procedures of FIG. 9, which follow the procedures of FIG. 8, are described.

(14) Step 14: The (R)AN transmits a N2 PDU Session Response message to the AMF. The N2 PDU Session Response message may include PDU session ID, Cause, N2 SM information (PDU Session ID, AN Tunnel Info, List of accepted/rejected QFI(s), User Plane Enforcement Policy Notification)), etc.

(15) Step 15: The AMF transmits an Update SM Context Request message (e.g., Nsmf_PDUSession_UpdateSMContext Request) to the SMF. The AMF forwards the N2 SM information received from (R)AN to the SMF.

(16a) Step S16a: The SMF initiates an N4 Session Modification procedure with the UPF. The SMF provides AN Tunnel Info to the UPF as well as the corresponding forwarding rules.

(16b) Step S16b: The UPF provides an N4 Session Modification Response to the SMF.

After this step, the UPF may deliver any DL packets to the UE that may have been buffered for this PDU session.

(16c) Step 16c: If the SMF has not yet registered for this PDU session, then the SMF may register with the UDM for a given PDU Session.

(17) Step 17: The SMF transmits an Update SM Context Response message (e.g., Nsmf_PDUSession_UpdateSMContext Response) to the AMF.

After this step, the AMF forwards relevant events subscribed by the SMF.

(18) Step 18: If during the procedure, any time after step 5, the PDU session establishment is not successful, the SMF may inform the AMF by invoking Nsmf_PDUSession_SMContextStatusNotify (Release). The SMF may also release any N4 session(s) created, any PDU session address if allocated (e.g., IP address) and release the association with PCF, if any. In this case, step 19 is skipped.

(19) Step 19: In the case of PDU Session Type IPV6 or IPv4v6, the SMF may generate an IPV6 Router Advertisement and send it to the UE.

(20) Step 20: The SMF may perform SMF initiated SM Policy Association Modification.

(21) Step 21: If the PDU Session establishment failed after step 4, the SMF may unsubscribe to the modifications of session management subscription data, if the SMF is no more handling a PDU session of the UE.

NWDAF will be explained. Sections 4 and 5 of 3GPP TS 23.288 V16.3.0 may be referred.

NWDAF is part of the 5G system architecture illustratively illustrated in FIG. 5. NWDAF interacts with different entities for various purposes:

- Data collection based on subscription to events provided by AMF, SMF, PCF, UDM, AF and OAM (Operation Administration Maintenance) (directly or through NEF)
- Retrieval of information from data repositories (e.g. UDR via UDM for subscriber-related information)
- Retrieval of information about NF (e.g. from NRF for NF-related information)

Providing consumers with analytics on demand

Single or multiple NWDAF instances may be deployed in a Public Land Mobile Network (PLMN). When multiple NWDAF instances are deployed, the 5G system architecture may deploy NWDAF as a central NF, a collection of distributed NFs, or a combination of both.

If multiple NWDAF instances exist, not all NWDAF instances need to provide the same type of analysis information. That is, some NWDAF instances may specialize in providing specific types of analytics information. Analysis ID Information Element (IE) is used to identify the type of supported analysis information that NWDAF can generate.

NWDAF instances can be collocated with 5GS NF.

The 5G system architecture allows NWDAF to collect data from arbitrary 5GC NFs. NWDAF belongs to the same PLMN as the 5GC NF that provides data.

The Nnf interface is defined as an interface through which NWDAF can request subscription to data delivery for a specific context, unsubscribe to data delivery, and request specific reporting of data for a specific context.

Through the 5G system architecture, NWDAF can call the OAM service to retrieve management data from OAM.

Additionally, the 5G system architecture allows any 5GC NF to request network analysis information from NWDAF. NWDAF belongs to the same PLMN as 5GC NF, which uses analysis information.

The Nnwdaf interface is defined as an interface through which 5GC NF can request subscription to network analysis information delivery for a specific context, cancel subscription to network analysis information delivery, and request specific reporting of network analysis information for a specific context.

NWDAF provides analysis information with 5GC NF and OAM.

Analysis information is statistical information or predictive information about past events.

Various NWDAF instances may exist in 5GC, and specialization is possible for each type of analysis information. The functionality of an NWDAF instance is described in the NWDAF profile stored in the NRF.

To assist NFs as consumers of analytics information by discovering NWDAF instances that can provide specific types of analytics information, each NWDAF instance provides a list of analytics IDs it supports when registering with the NRF, in addition to other NRF registration elements in the NF profile. Other NFs that need to discover NWDAF instances that provide support for a particular type of analytics can query the NRF and include an analytics ID that identifies the desired type of analytics for that purpose.

Consumers such as 5GC NF and OAM decide how to use the data analytics information provided by NWDAF.

Interaction between 5GC NF and NWDAF takes place within PLMN.

NWDAF has no knowledge of NF application logic. NWDAF may use subscription data for statistical purposes only.

The NWDAF service consumer uses the NWDAF search principles to select a NWDAF that supports the requested analysis information.

3. Data Collection from Terminal

The NWDAF may interact with an AF to collect data from UE Application(s) as an input for analytics generation. The AF can be in the MNO domain or an AF external to MNO domain. The data collection request from NWDAF may trigger the AF to collect data from the UE Application.

The UE establishes a connection to the AF in the MNO domain or external to MNO domain over user plane via a PDU session. The AF communicates with the UE Application and collects data from UE Application.

For both an AF in trusted domain and an AF in untrusted domain (which supports to collect data from a UE application), the SLA between the operator and the application service provider (i.e. ASP) determines:

The AF for the UE Application to connect to (e.g. based on the FQDN).

The information that the UE Application shares with the AF, subject to user consent.

Possible Data Anonymization, Aggregation or Normalization, algorithms (if used).

The authentication information that enable the AF to verify the authenticity of the UE's Application that provides data.

NOTE 1: The mutual authentication info that is used by the UE Application and the AF and how user consent is obtained is out of SA WG2's scope.

The AF (which supports the data collection) is configured based on the SLA above.

A UE Application (which supports to providing data to an AF) is configured/provisioned with the below information from the ASP:

The address of the AF to contact.

The parameters that the UE Application is authorized to provide to the AF.

The authentication information to enable the UE Application to verify the authenticity of the AF that requests data.

4. Data Collection Procedure from Terminal (1) Connection Establishment Between UE Application and AF The UE Application receives the data collection configuration from ASP.

The UE Application establishes a user plane connection to the AF. Data collection procedure from the UE is performed via the user plane connection.

NOTE 1: In order to preserve resources (e.g. battery, quota) for the end user, a user plane connection to the AF should only be established when the UE has an active PDU Session for the UE Application and it is actively using the network (i.e. it should not be established when the UE Application is inactive, or used in an off-line mode).

Both direct data collection procedure (from the UE Application to the AF, either in trusted domain or untrusted domain) and indirect data collection procedure (from the UE Application to the Application server and from the Application server to the AF) shall be supported. The data collection procedure is out of scope of the present specification.

Appropriate reference to SA4 Working Group 4 specification for data collection procedure is needed.

The UE Application provides the External Application ID to the AF. The AF stores the information from the UE Application along with the retrieved IP address of the UE (in the PDU session used) in order to request data collection from the UE Application. The UE IP address is used by the AF to identify the user plane connection.

(2) Data Collection Procedure from Terminal

FIG. 10 shows the data collection procedure from the terminal.

1. An NF subscribes to Analytics from the NWDAF as described in clause 6.1.1.1, that includes Analytics ID, Analytics Filter Information including e.g. AoI, Internal Application ID(s) and Target of Analytics Reporting. NWDAF may also initiate the data collection prior to this subscription.

2. NWDAF discovers the AF that provides data collection (based on the AF profiles registered in NRF).

Step 3a is used for the AF in trusted domain while step 3b is used for the AF in untrusted domain.

3a. NWDAF subscribes to the AF in trusted domain for UE data collection input data for analytics, by using Naf_Event_Exposure_Subscribe.

3b. NWDAF subscribes to the AF in untrusted domain for UE data collection input data for analytics, by using step 2 and step 3 of the procedure that is described in FIG. 6.2.2.3-1 of TS23.288 v17.0.0.

4. The AF collects the UE data using either direct or indirect data collection procedure. The establishment of the connection can be performed at any time prior to this. The AF links the data collection request from step 3 to the user plane connection.

NOTE 1: The Direct data collection and indirect data collection procedure is decided by SA4 Working Group 4.

Appropriate reference to SA4 Working Group 4 specification for data collection procedure is needed Step 5a is used for the AF in trusted domain while step 5b is used for the AF in untrusted domain.

5a. The AF in trusted domain receives the input data from the UE, and processes the data (e.g. anonymizes, aggregates and normalizes) according to the SLA that is configured in the AF, Event ID(s) and Event Filter(s) set during step 3a. The trusted AF then notifies the NWDAF on the processed data collected according to the NWDAF subscription in step 3a.

5b. The AF in untrusted domain receives the input data from the UE, and processes the data (e.g. anonymizes, aggregates and normalizes) according to the SLA that is configured in the AF, Event ID(s) and Event Filter(s) set during step 3b. The untrusted AF notifies the NWDAF on the processed data collected by using step 5b (i.e. Step 4 and step 5 of the procedure that described in FIG. 6.2.2.3-1 of TS23.288 v17.0.0).

NOTE 2: If the target of analytics reporting is "any UE", the AF either before step 5a (the AF in trusted domain) or before step 5b (the AF in untrusted domain) can process (e.g. anonymize, aggregate and normalize) the data from multiple UEs according to the SLA configured in the AF, Event ID(s) and Event Filter(s) set during step 3a or 3*b* before notifying the NWDAF on the processed data.

6. The NWDAF produces Analytics.

7. The NWDAF provides analytics to the consumer NF.

Any steps related to architecture enhancement (e.g. DCCF) in this procedure will need further updates.

II. PROBLEMS SOUGHT TO BE SOLVED BY THE DISCLOSURE OF THIS SPECIFICATION

According to the UE data collection procedure, the UE application forms a user plane connection (e.g., a connection using HTTPS) with the AF that collects data, and the AF collects data (e.g., Service Experience data/QoE metrics, UE mobility related data (expected destination, expected route, expected movement speed, expected arrival time)) from the UE through this connection.

The following information is set in the UE application (which can provide data to AF).

- The address of the AF to contact
- The parameters that the UE Application is authorized to provide to the AF
- The authentication information to enable the UE Application to verify the authenticity of the AF that requests data However, conventionally it has not been discussed when the UE forms a user plane connection with the AF. As an example, to conserve resources (e.g. battery, quota) for the last user, user plane connections to AF should only be established when the UE has an active PDU session for a UE application and is actively using the network. To save resources, a user plane connection with AF is not established when the UE application is inactive or operates in off-line mode.

However, as the UE application operates active or in on-line mode, there may not actually be a data collection request from the AF despite establishing a user plane connection with the AF. In this case, the data collection connection established by the UE with the AF becomes unnecessary, and the UE's resources (e.g. battery, etc.) are wasted. Accordingly, an efficient method for UE data collection is proposed.

III. DISCLOSURE OF THIS SPECIFICATION

The disclosures described later in this specification may be implemented in one or more combinations (e.g., a combination including at least one of the contents described below). Each of the drawings represents an embodiment of each disclosure, but the embodiments of the drawings may also be implemented in combination with each other.

The efficient UE data collection method proposed in the disclosure of this specification may consist of a combination of one or more of the following operations/configurations/steps. The methods described below can be performed or used in combination or complementary.

UE, UE Application, UE Application Client, Application Client, UE ASP Application Client, ASP Application Client, UE ASP Client, ASP Client, etc. may be used interchangeably.

1. First Embodiment

Figure 11:
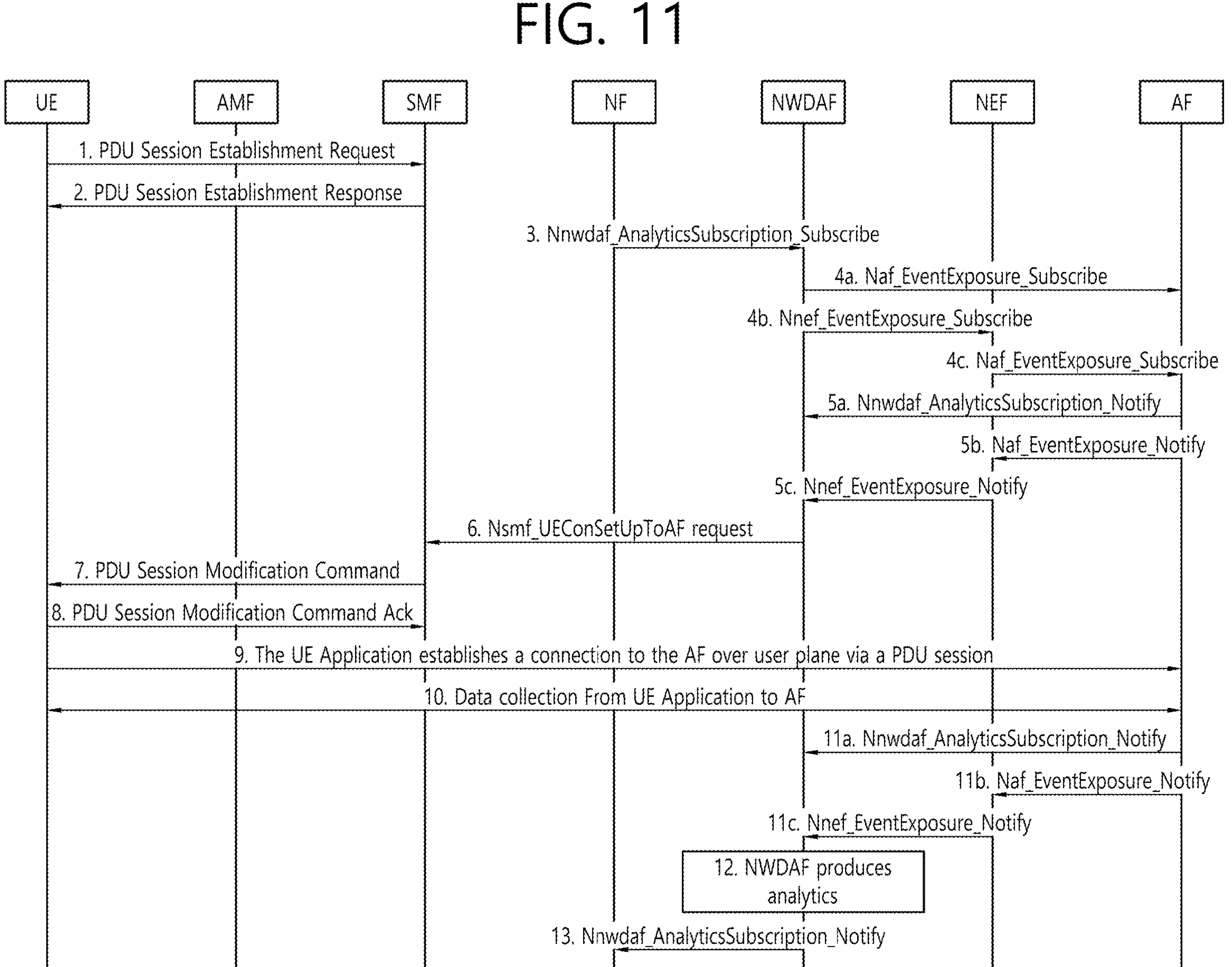
FIG. 11 shows the procedure of the first embodiment.

FIG. 11 shows the procedure of the first embodiment.

The SMF may instruct/request the UE to form a user plane connection for data collection through an SM NAS message.

Step 1) When the UE creates a PDU session (included in the PDU Session Establishment Request message) or modifies it (included in the PDU Session Modification Request message), the UE may inform the SMF of the following information.

- Information indicating that the request to form a user plane connection for UE data collection is supported (indicating that the SMF can perform operations if toe form a user plane connection with the AF for UE data collection is requested).

The information may be included in the SM NAS message as the form of a new parameter or through an existing parameter extension (e.g., PCO extension).

The information may be provided together with information indicating which application(s) the information is for (e.g., application identification information such as App ID).

The PDU session may be a PDU session used by the UE to establish a user plane connection with the AF for data collection.

Step 2) The SMF may respond to the information included by the UE in step 1) with the following information.

- Information indicating that the request to form a user plane connection for UE data collection is supported (indicating that the SMF can perform operations if toe form a user plane connection with the AF for UE data collection is requested).

The information may be included in the SM NAS message as the form of a new parameter or through an existing parameter extension (e.g., PCO extension).

The information may be provided together with information indicating which application(s) the information is for (e.g., application identification information such as App ID).

If the UE does not receive the information from the SMF, it may decide to establish a user plane connection with the AF for data collection.

Alternatively, the SMF may transmit the SM NAS message to the UE by including information indicating or requesting that a user plane connection be formed for data collection in the SM NAS message. The SM NAS message may include information b) to g) described in step 6) below. This information may be included in the SM NAS message as the form of new parameters or through existing parameter extensions (e.g., PCO extensions).

The UE may perform data collection operations regardless of whether a user plane connection is formed with the AF for data collection.

Step 3) NF may join analytics with NWDAF

Step 4) NWDAF may request UE data from the AF for UE data collection. This may be understood as NWDAF subscribing to the UE data provision service as AF. (e.g., due to analytics requests received from other NFs, etc.)

This may be for analytics generation, as shown in FIG. 6.2.8.2.3-1 (Data Collection Procedure from UE) of TS 23.288 v17.0.0, and requests to AF may refer to Step 3a and Step 3b.

4a may indicate that NWDAF joins directly to the AF in the trusted domain, and 4b/4c may indicate that NWDAF joins the AF in the untrusted domain through NEF.

The AF contacted by NWDAF may be an AF that processes UE data collection for a specific application. When processing UE data collection for multiple applications, NWDAF may include information about the application that requires data collection (e.g., Application identification information such as App ID) in the request.

Step 5) AF may inform NWDAF about UEs for which a user plane connection for data collection has not been established among UEs for which UE data collection has been requested/needed. For this purpose, conventional service operations may be expanded and used, or new service operations may be defined and used.

AF may determine whether a user plane connection for data collection has been formed for UEs that have received a request for UE data collection from NWDAF (i.e., whether there is a connection for requesting, to the UE, to collect data and/or to transmit the collected data)

The AF may obtain information identifying the UE that NWDAF has requested to provide data (e.g., SUPI(s), GPSI(s), group identification information, IP address information of UEs, etc.) from one or more NFs through one or more of the following processes.

is provided by NWDAF or obtain from NWDAF, e.g., in step 4) and/or after the step 4).

After the step 4), is provided by other NF other than NWDAF (e.g., SMF, UDM, AMF, etc.) or obtain from other NF other than NWDAF AF may inform NWDAF about UEs for which a user plane connection for data collection has not been established among UEs for which UE data collection has been requested/needed. It may explicitly or implicitly include one or more of the following information:

i) Information on UEs for which a user plane connection has not been established for data collection (e.g. SUPI(s), GPSI(s), group identification information, IP address information of UEs, etc.)

ii) Information indicating a request to establish a user plane connection for data collection iii) Information about the application for which forming user plane connection is requested for data collection (e.g., application identification information such as App ID)

iv) The address of the AF to contact v) The parameters that the UE Application is authorized to provide to the AF vi) The authentication information to enable the UE Application to verify the authenticity of the AF that requests data vii) Time (or time point) required to form a user plane connection for data collection viii) Time (or time point) at which the UE should be requested to form a user plane connection for data collection The information transmitted by the AF to NWDAF may be included in a response message to the message in step 4), a notification message for NWDAF's subscription message, or other messages.

Some or all of the above information may be provided for each application or UE.

The AF performing step 5) may be due to NWDAF requesting it.

5a may be performed when 4a is performed, and 5b/5c may be performed when 4b/4c is performed.

Step 6) As a result of 5a or 5c, based on the information received from the AF, the NWDAF may transmit, to the SMF(s) (serving the UE(s) requested to form a user plane connection for data collection), message requesting or instructing to establish user plane connection for data collection for the UE(s). The requesting or instructing message may explicitly or implicitly include one or more of the following information. For this purpose, conventional service operations may be expanded and used, or new service operations may be defined and used.

a) Information of UEs requested to forming a user plane connection for data collection (e.g. SUPI(s), GPSI(s), group identification information, IP address information of UEs, etc.)—This may be interpreted as information on UEs for which a user plane connection for data collection has not been established.

b) Information indicating a request to form a user plane connection for data collection c) Information about the application for which forming a user plane connection is being requested for data collection (e.g. application identification information such as App ID)

d) The address of the AF to contact e) The parameters that the UE Application is authorized to provide to the AF f) The authentication information to enable the UE Application to verify the authenticity of the AF that requests data g) Time (or time point) required to establish a user plane connection for data collection h) Time (or time point) at which the UE should be requested to establish a user plane connection for data collection.

Some or all of the above information may be provided for each application or UE.

Step 7) The SMF(s) receiving the request from NWDAF may transmit, to the UE(s), an SM NAS message (e.g., PDU Session Modification Command, newly defined SM NAS message) including information instructing/requesting to form user plane connection for data collection. The SM NAS message may include information b) to g) described in step 6).

The information may be included in the SM NAS message as the form of a new parameter or through an existing parameter extension (e.g., PCO extension).

The SMF may transmit the SM NAS message only if the UE supports the operation for the request based on step 1).

When the SMF receives g) or h) information described in step 6), it may transmit the SM NAS message to the UE at the corresponding time (or time point).

SMF may also transmit a response message to NWDAF's request/instruction message. This may be before or after transmitting the message to the UE.

Step 8) UE may respond to SMF. This may be performed after step 9.

Step 9) The UE may form a user plane connection with the AF for data collection. The address information of the AF may be set in the UE or may be provided from the SMF. If both exist, the one provided by SMF may be used in priority.

Step 10) AF may collect data from the UE.

Step 11) AF may provide UE data to NWDAF. 11a can be performed when 4a is performed, and 11b/11c can be performed when 4b/4c is performed.

Step 12) NWDAF may generate the analytics requested by NF in step 3 above.

Step 13) NWDAF may provide analytics to the NF.

2. Second Embodiment

Figure 12:
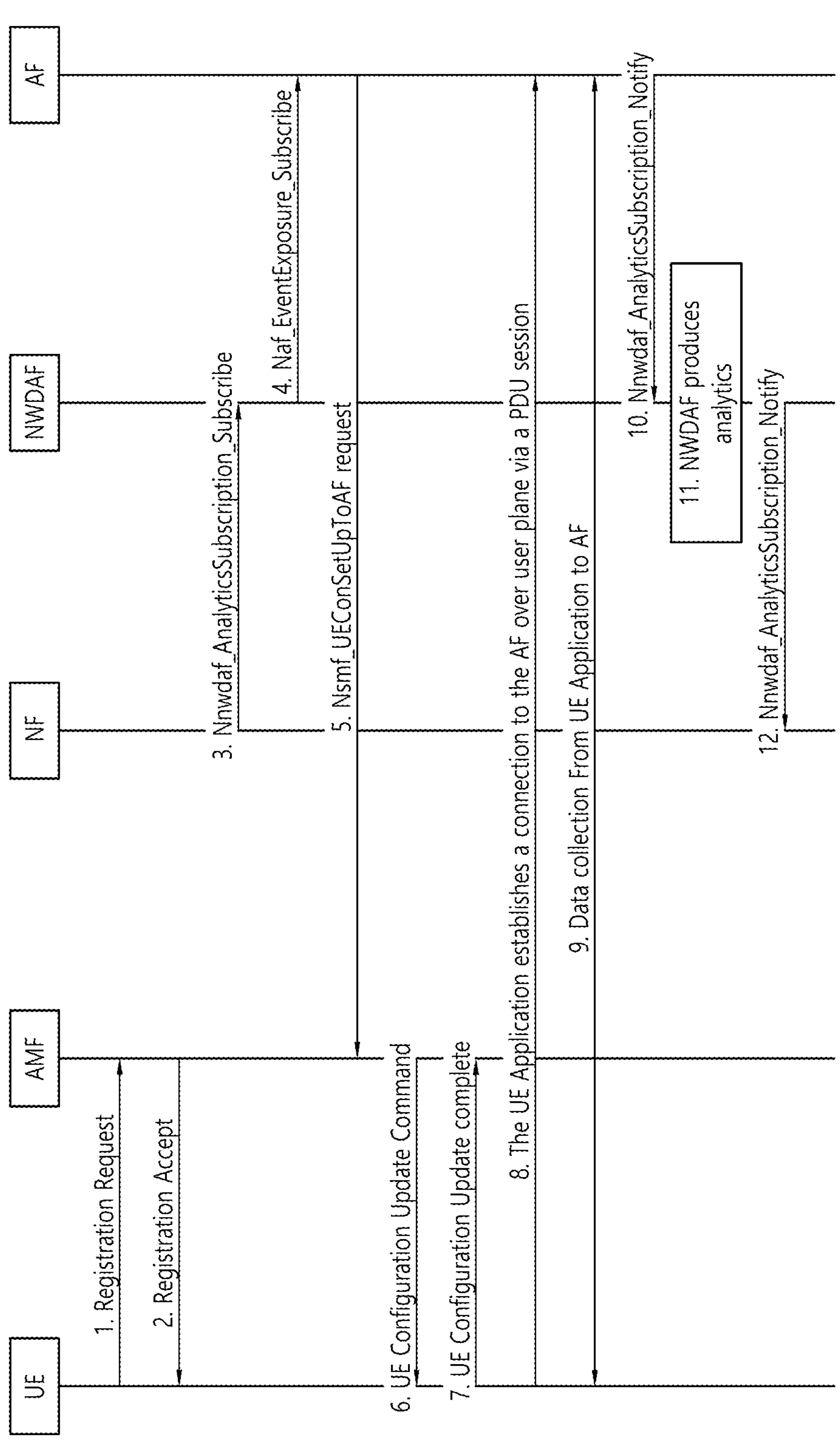
FIG. 12 shows the procedure of the second embodiment.

FIG. 12 shows the procedure of the second embodiment.

AMF may instruct or request the UE to form a user plane connection for data collection through an MM NAS message.

Step 1) The UE may inform the AMF of the following information. This is possible at various times, such as during a registration operation or a service request. During the registration operation, it may be included in the registration request message. When requesting service, it may be included in the service request message.

Information indicating that the request to form a user plane connection for UE data collection is supported (indicating that the UE can perform operations if forming a user plane connection with the AF for UE data collection is requested from AMF).

The information may be included in the MM NAS message as the form of a new parameter or through an existing parameter extension.

The information may be provided together with information indicating which application(s) the information is for (e.g., application identification information such as App ID).

Step 2) The AMF may respond to the information included by the UE in step 1) with the following information.

Information indicating that the request to form a user plane connection for UE data collection is supported (indicating that the AMF can perform operations if toe form a user plane connection with the AF for UE data collection is requested).

The information may be included in the MM NAS message as the form of a new parameter or through an existing parameter extension.

The information may be provided together with information indicating which application(s) the information is for (e.g., application identification information such as App ID)

If the UE does not receive the information from the AMF, it may decide to establish a user plane connection with the AF for data collection.

Alternatively, the AMF may transmit the MM NAS message (e.g., UE Configuration Update Command, a new defined MM NAS message) to the UE by including information indicating or requesting that a user plane connection be formed for data collection in the MM NAS message. The MM NAS message may include information ii) to vii) described in step 5) below. This information may be included in the MM NAS message as the form of new parameters or through existing parameter extensions.

The UE may perform data collection operations regardless of whether a user plane connection is formed with the AF for data collection.

Step 3) NF may join analytics with NWDAF

Step 4) may be the same as step 4) of the first embodiment.

Step 5 AF may determine whether a user plane connection for data collection has been formed for UEs that have received a request for UE data collection from NWDAF (i.e., whether there is a connection for requesting, to the UE, to collect data and/or to transmit the collected data). For this, step 5) of the first embodiment may be referred.

The AF may transmit to the AMF(s) (serving a UE(s) for which a user plane connection for data collection has not been established among UEs for which UE data collection is requested or necessary), message requesting or instructing to establish user plane connection for data collection for the UE(s). For this purpose, conventional service operations may be expanded and used, or new service operations may be defined and used.

The request or instruction message may explicitly or implicitly include one or more of the following information.

i) Information on UEs for which a user plane connection for data collection has not been established (e.g. SUPI (s), GPSI(s), group identification information, etc.)

ii) Information indicating a request to form a user plane connection for data collection iii) Information about the application for which forming a user plane connection for data collection is requested (e.g., application identification information such as App ID)

iv) The address of the AF to contact v) The parameters that the UE Application is authorized to provide to the AF vi) The authentication information to enable the UE Application to verify the authenticity of the AF that requests data vii) Time (or time point) required to form a user plane connection for data collection viii) Time (or time point) at which the UE should be requested to form a user plane connection for data collection The information that the AF transmits to the AMF may be included when transmitting a message to request/subscribe to the AMF for information about the UE (e.g., UE location information, etc.), and a message for transmitting the information may be transmitted to the AMF.

Some or all of the above information may be provided for each application or UE.

The AF performing step 5) may be due to the NWDAF requesting it (either through step 4 or separately).

Step 6) The AMF(s) receiving the request from the AF may send, to the UE(s), an MM NAS message (e.g., UE Configuration Update Command, and newly defined MM NAS message) including message requesting or instructing to establish user plane connection for data collection. The MM NAS message may include information ii) to vii) described in the step 5) above.

The information may be included in the MM NAS message as the form of a new parameter or through expansion of existing parameters.

AMF may transmit the MM NAS message only if the UE supports the operation for the request based on the step 1).

When the AMF receives vii) or viii) information described in the step 5), it may transmit the MM NAS message to the UE at the corresponding time (or time point).

AMF may also transmit a response message to NWDAF's request/instruction message. This may be before or after transmitting the message to the UE.

Step 7) UE may respond to AMF. This may be performed after step 8.

Step 8) The UE may form a user plane connection with the AF for data collection. The address information of the AF may be set in the UE or may be provided from the AMF. If both exist, the one provided by AMF may be used in priority.

If the PDU session used to form the user plane connection has not yet been formed, the UE may form a user plane connection with the AF for data collection after forming the PDU session.

Step 9) AF may collect data from the UE.

Step 10) AF may provide UE data to NWDAF.

Step 11) NWDAF may generate the analytics requested by NF in step 3 above.

Step 12) NWDAF may provide analytics to the NF.

3. Third Embodiment

Figure 13:
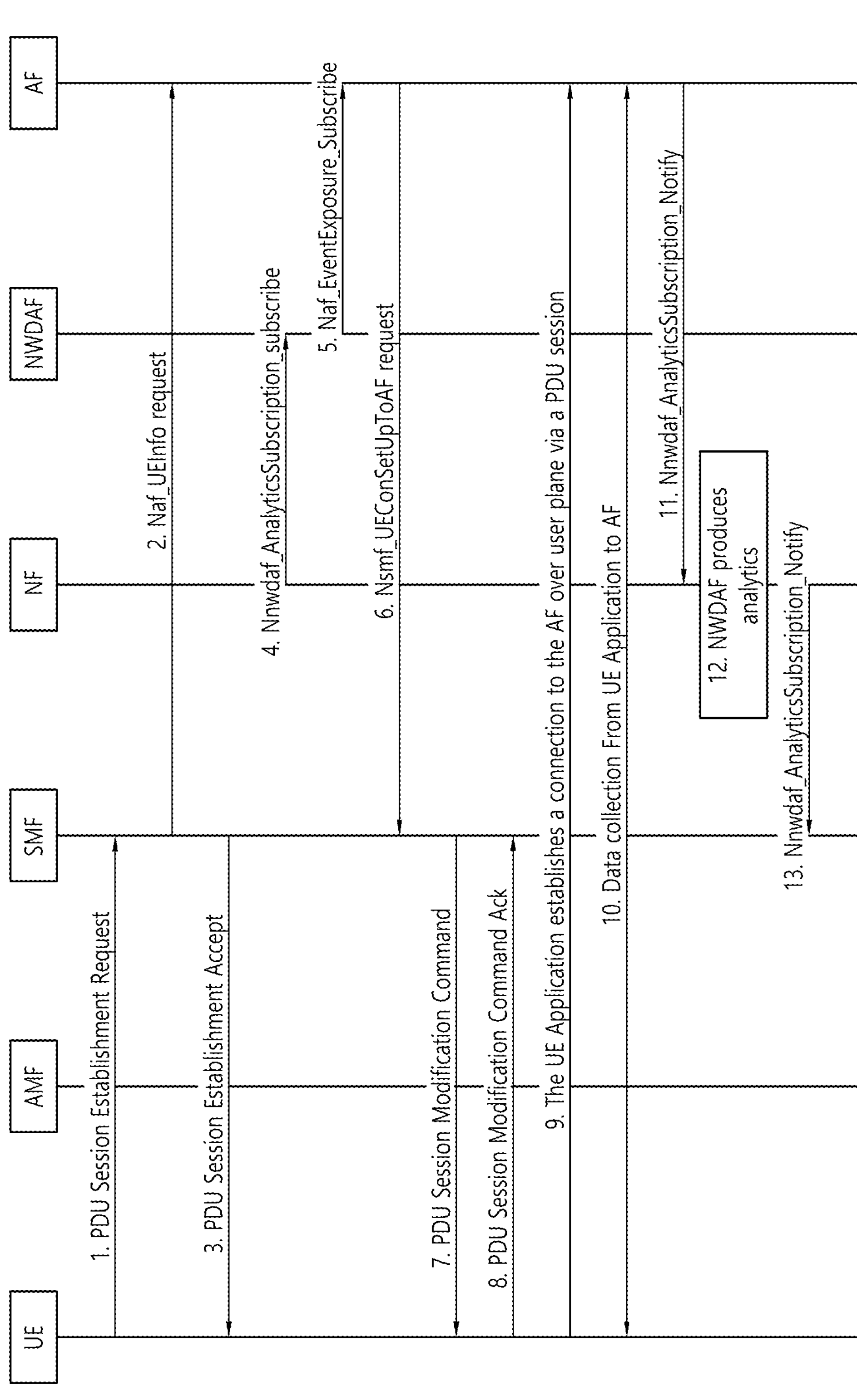
FIG. 13 shows the procedure of the third embodiment.

FIG. 13 shows the procedure of the third embodiment.

Step 1) may be the same as step 1) of the first embodiment.

Step 2) based on the information transmitted by the UE in step 1) and/or the UE's subscriber information (this may be information indicating support for a request to form a user plane connection for UE data collection), SMF may provide information about the UE to AF for UE data collection. The information about the UE may include UE identification information (e.g., SUPI, GPSI, UE IP address information, etc.). The message from the SMF to AF may be transmitted via UPF.

Step 3) may be the same as step 2) of the first embodiment.

Step 2) and step 3) may be performed simultaneously, or step 3) may be performed prior to step 2).

Step 4) NF may join analytics with NWDAF.

Step 5) may be the same as step 4) of the first embodiment.

Step 6) AF may determine whether a user plane connection for data collection has been formed for UEs that have received a request for UE data collection from NWDAF (i.e., whether there is a connection for the UE to request data collection and/or transfer of the collected data). For this, the step 5) of the first embodiment may be referred.

AF may transmit, to the SMF(s)(serving a UE(s) for which a user plane connection for data collection has not been established among UEs for which UE data collection is requested or necessary), a message requesting or instructing to form a user plane connection for date collection for the UE(s). For this purpose, a new service operation may be defined and used, or a conventional service operation may be expanded and used.

The AF may transmit to the SMF(s) (serving a UE(s) for which a user plane connection for data collection has not been established among UEs for which UE data collection is requested or necessary), message requesting or instructing to establish user plane connection for data collection for the UE(s). The request or instruction message may explicitly or implicitly include one or more of the information i)-vi) of step 5) of the first embodiment.

The request transmitted by the AF to the SMF may be a request for each UE, or may be a request for multiple UEs served by the same SMF. The request from the AF to the SMF may be transmitted through UPF.

Some or all of the above information may be provided for each application or UE.

The AF performing step 6) may be due to the NWDAF requesting it (via step 5 or separately).

Step 7) The SMF(s) receiving the request from AF may transmit, to the UE(s), an SM NAS message (e.g., PDU Session Modification Command, newly defined SM NAS message) including information instructing/requesting to form user plane connection for data collection. The SM NAS message may include information ii) to vi) of step 5) of the first embodiment.

The information may be included in the SM NAS message as the form of a new parameter or through an existing parameter extension (e.g., PCO extension).

The SMF may transmit the SM NAS message only if the UE supports the operation for the request based on step 1).

The SMF may also transmit a response message to the AF's request/instruction message. This may be before or after transmitting the message to the UE.

Step 8) UE may respond to SMF. This may be performed after step 9.

Step 9) The UE may form a user plane connection with the AF for data collection. The address information of the AF may be set in the UE or may be provided from the SMF. If both exist, the one provided by SMF may be used in priority.

Step 10) AF may collect data from the UE.

Step 11) AF may provide UE data to NWDAF.

Step 12) NWDAF may generate the analytics requested by NF in step 4) above.

Step 13) NWDAF may provide analytics with NF.

4. Fourth Embodiment

FIG. 14 shows the procedure of the fourth embodiment.

SMF, a consumer NF of analytics provided by NWDAF, may instruct or request the UE to form a user plane connection for data collection through an SM NAS message.

Step 1) When the UE establishes a PDU session, the following information in the PDU Session Establishment Request message may be notified to the SMF.

Information indicating that a request to form a user plane connection for UE data collection is supported (indicating that the UE can perform operations if forming a user plane connection with the AF for UE data collection is requested from SMF)

Step 2) The SMF may respond to the information included by the UE in step 1) with the following information.

Information indicating that a request to form a user plane connection for UE data collection is supported (indicating that the SMF can perform operations if forming a user plane connection with the AF for UE data collection is requested from SMF)

If the SMF requests or wishes to request analytics provided by NWDAF, the SMF may include information instructing or requesting the UE to form a user plane connection for data collection in the response message. Including the instruction or request information may be because the analytics requires UE data (e.g., NF load analytics, Service Experience, etc.). The information instructing or requesting may be based on the local configuration of the SMF, information received from the UE in step 1), subscriber information of the UE, etc.

Step 3) SMF may join analytics with NWDAF.

Step 4) instead of providing information instructing or requesting the UE to form user plane connection for data collection in step 2), SMF may separately transmit SM NAS message containing information instructing or requesting this (e.g. PDU Session Modification Command, newly defined SM NAS message).

Providing the instruction or request information to the UE may be because the analytics (e.g., NF load analytics, Service Experience, etc.) requires UE data when the SMF requests or wants to request analytics provided by NWDAF. Providing the indication or request information to the UE may be based on the local configuration of the SMF, information received from the UE in step 1), subscriber information of the UE, etc.

Step 4) may be performed before step 3) or may be performed simultaneously.

Step 5) The UE may respond to the SMF.

Step 6) If the UE is provided with information instructing or requesting to form user plane connection for data collection from the SMF in step 2) or step 4), the UE application establishes user plane connection with AF for UE data collection via PDU session.

Step 7) NWDAF may request UE data from the AF for UE data collection. This may be performed before step 3) above (e.g., due to analytics requests received from other NFs, etc.). Alternatively, it may be performed immediately following step 3).

7a indicates that NWDAF joins directly to the AF in the trusted domain, and 7b/7c indicates that NWDAF joins the AF in the untrusted domain through NEF.

Step 8) AF may collect data from the UE.

Step 9) AF may provide UE data to NWDAF. 9a may be performed when 7a is performed, and 9b/9c may be performed when 7b/7c is performed.

Step 10) NWDAF may generate the analytics requested by SMF in step 3) above.

Step 11) NWDAF may provide analytics to SMF.

5. Fifth Embodiment

Indicates how the UE determines the formation of a user plane connection with the AF for data collection.

The UE may vary the decision to form a user plane connection with the AF for data collection for the UE application based on one or more of the following information. The information below may be UE application-specific information, or may be common information for all UE applications that provide data to the AF for data collection.

a) Whether the UE Application is Mainly in Active State or in Inactive State

For example, if the application is mainly in an active state, the UE may determine to form a user plane connection with the AF for data collection when the application becomes active. As another example, when an application is mainly in an inactive state, the UE may determine not to form a user plane connection with the AF for data collection even if the application becomes active. In this case, when the UE is requested or instructed to form a user plane connection with the AF for data collection from the SMF (as in the first embodiment and the third embodiment) or from the AMF (as in the second embodiment), a user plane connection may be formed.

b) Whether the UE Application is Mainly Used/Operated in On-Line Mode or Mainly in Off-Line Mode For example, if the application is mainly used in on-line mode, the UE may decide to form a user plane connection with the AF for data collection for the application. As another example, when an application is mainly used in off-line mode, the UE may determine not to form a user plane connection with the AF for data collection for the application. In this case, when the UE is requested or instructed to form a user plane connection with the AF for data collection from the SMF (as in the first embodiment and the third embodiment) or from the AMF (as in the second embodiment), a user plane connection may be formed.

c) History/Experience Information that AF for Data Collection Requests for UE Applications For example, if an application frequently receives data requests from the AF for data collection over a certain period of time in the past, or receives data requests more than a certain number of times, it may be determined to form a user plane connection with the AF for data collection for the application by default. As another example, if the application has not frequently received data requests from the AF for data collection over a certain period of time in the past, or has received them less than a certain number of times, it may be determined not to form a user plane connection with the AF for data collection for the application by default. In this case, when the UE is requested/instructed to form a user plane connection with the AF for data collection from the SMF (as in the first embodiment and the third embodiment) or from the AMF (as in the second embodiment), a user plane connection may be formed.

d) User Plane Connection Formation Policy Configured in the UE Application

The policy may be configured by the ASP (Application Service Provider), 5G CN (e.g. PCF, etc.), AF, etc. for the UE application, or may be set locally. The policy may be information about when to form a user plane connection with the AF for data collection for the application. For example, it can be set as it is always formed, formed when it is active, formed at a specific time (e.g. every Monday at 11 pm, the 1st of every month at 2 am, etc.), formed at a specific location (this is can be expressed as cell(s), TAI(s), PLMN ID(s), coordinate information, regional information, etc.), formed when roaming and/or non-roaming, or formed when request/instruction is received from the network (e.g. SMF, AMF, etc.), etc.

e) Status Information of the UE (e.g. Remaining Battery Level, Etc.):

For example, if the remaining battery capacity of the UE is 70% or more, it may be determined to form a user plane connection with the AF for data collection. As another example, if the remaining battery capacity of the UE is less than 60%, it may be determined not to form a user plane connection with the AF for data collection.

In this specification, a request to collect data from/to the UE may be interpreted as a request to provide data collected from/to the UE.

Figure 15:
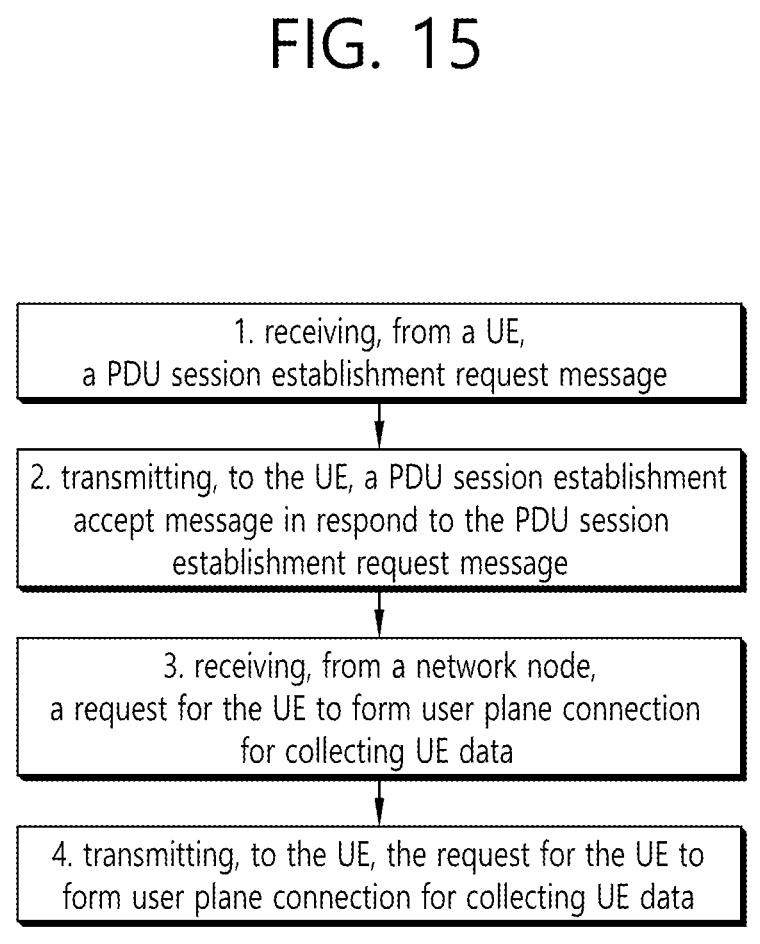

FIG. 15 is a flowchart showing the procedures performed by a SMF.

1. The SMF may receive, from a UE (User Equipment), a PDU (Protocol Data Unit) session establishment request message.

The PDU session establishment request message may include information that the UE supports request to form user plane connection for collecting UE data.

2. The SMF may transmit, to the UE, a PDU session establishment accept message in respond to the PDU session establishment request message.

3. The SMF may receive, from a network node, a request for the UE to form user plane connection for collecting UE data.

4. The SMF may transmit, to the UE, the request for the UE to form user plane connection for collecting UE data.

The network node may be a NWDAF (network data analytics function).

The SMF may transmit, to an AF (application function), information on the UE.

The information on the UE may include identification information of the UE.

The network node may be the AF (application function).

The request for the UE to form user plane connection may be a NAS (Non-Access-Stratum) message.

Figure 16:
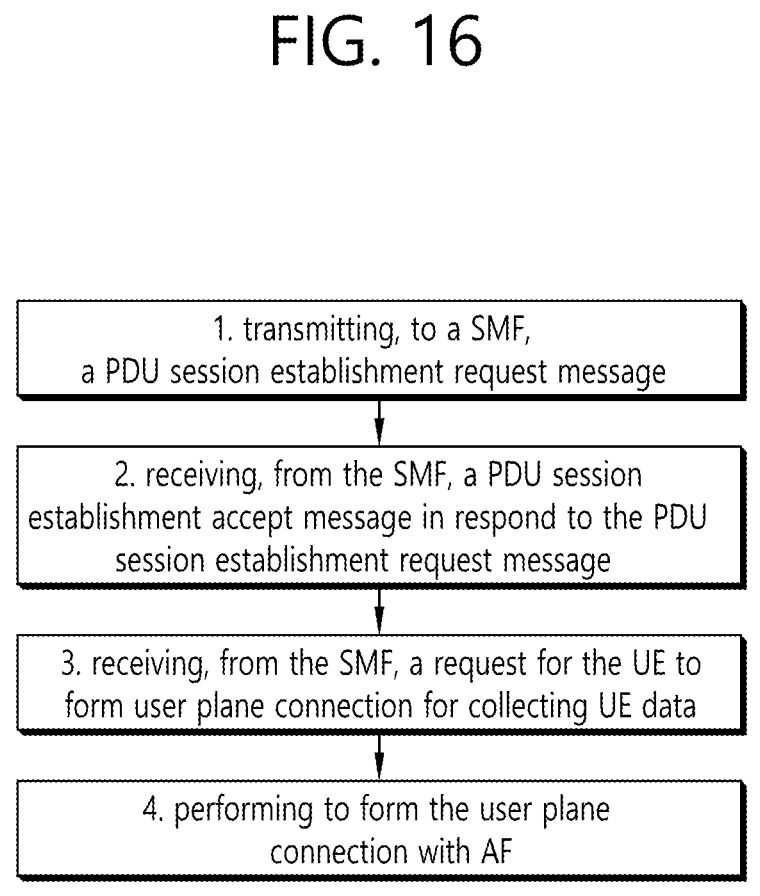

FIG. 16 is a flowchart showing the procedures performed by a UE.

1. The UE may transmit, to a SMF (Session Management Function), a PDU (Protocol Data Unit) session establishment request message.

The PDU session establishment request message may include information that the UE supports request to form user plane connection for collecting UE data.

2. The UE may receive, from the SMF, a PDU session establishment accept message in respond to the PDU session establishment request message.

3. The UE may receives, from the SMF, a request for the UE to form user plane connection for collecting UE data.

4. The UE may perform to form the user plane connection with AF (application function).

The request for the UE to form user plane connection may be a NAS (Non-Access-Stratum) message.

Hereinafter, a processor for providing communication in a wireless communication system according to some embodiments of the present specification will be described.

The processor may perform: transmitting, to a SMF (Session Management Function), a PDU (Protocol Data Unit) session establishment request message, wherein the PDU session establishment request message includes information that the UE supports request to form user plane connection for collecting UE data: receiving, from the SMF, a PDU session establishment accept message in respond to the PDU session establishment request message: receiving, from the SMF, a request for the UE to form user plane connection for collecting UE data: performing to form the user plane connection with AF (application function).

Hereinafter, a non-volatile computer readable medium storing one or more instructions for performing communication according to some embodiments of the present specification will be described.

According to some embodiments of the present disclosure, the technical features of the present disclosure may be directly implemented as hardware, software executed by a processor, or a combination of the two. For example, in wireless communication, a method performed by a wireless device may be implemented in hardware, software, firmware, or any combination thereof. For example, the software may reside in RAM memory, flash memory, ROM memory, EPROM memory, EEPROM memory, registers, hard disk, removable disk, CD-ROM, or other storage medium.

Some examples of a storage medium are coupled to the processor such that the processor can read information from the storage medium. Alternatively, the storage medium may be integrated into the processor. The processor and storage medium may reside in the ASIC. For another example, a processor and a storage medium may reside as separate components.

Computer-readable media can include tangible and non-volatile computer-readable storage media.

For example, non-volatile computer-readable media may include random access memory (RAM), such as synchronization dynamic random access memory (SDRAM), read-only memory (ROM), or non-volatile random access memory (NVRAM). Read-only memory (EEPROM), flash memory, magnetic or optical data storage media, or other media that can be used to store instructions or data structures or Non-volatile computer readable media may also include combinations of the above.

Further, the methods described herein may be realized at least in part by computer-readable communication media that carry or carry code in the form of instructions or data structures and that can be accessed, read, and/or executed by a computer.

According to some embodiments of the present disclosure, a non-transitory computer-readable medium has one or more instructions stored thereon. The stored one or more instructions may be executed by a processor of the base station.

The stored one or more instructions cause the processors to: transmitting, to a SMF (Session Management Function), a PDU (Protocol Data Unit) session establishment request message, wherein the PDU session establishment request message includes information that the UE supports request to form user plane connection for collecting UE data: receiving, from the SMF, a PDU session establishment accept message in respond to the PDU session establishment request message; receiving, from the SMF, a request for the UE to form user plane connection for collecting UE data; performing to form the user plane connection with AF (application function).

The present specification may have various effects.

For example, through the method disclosed in the present specification, a user plane connection with AF is formed only for UEs that need data collection, it is possible to prevent inefficiency in which a UE that does not need data collection forms a user plane connection with the AF.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method. Other implementations are within the scope of the following claims.

What is claimed is:

1. A method for performing wireless communication, performed by a SMF (Session Management Function), comprising:

receiving, from a UE (User Equipment), a PDU (Protocol Data Unit) session establishment request message;

wherein the PDU session establishment request message includes UE information related to establishment of a user plane connection for collecting UE data based on a request to establish the user plane connection from the SMF, transmitting, to the UE, a PDU session establishment accept message in response to the PDU session establishment request message; and receiving, from a network node, a request message for the UE to establish the user plane connection for collecting UE data;

wherein the request message includes information related to time required to establish a user plane connection, transmitting, to the UE, a NAS (Non-Access-Stratum) message including information related to a request to establish the user plane connection for collecting UE data at the time, based on the UE information and the request message.

2. The method of claim 1, wherein the network node is a NWDAF (network data analytics function).

3. The method of claim 1, further comprising:

transmitting, to an AF (application function), information on the UE, wherein the information on the UE includes identification information of the UE, wherein the network node is the AF (application function).

4. The method of claim 1, wherein the PDU session establishment accept message includes SMF information that the SMF supports requesting the UE to establish the user plane connection, based on the UE information.

5. A method for performing wireless communication, performed by a UE (User Equipment), comprising:

transmitting, to a SMF (Session Management Function), a PDU (Protocol Data Unit) session establishment request message;

wherein the PDU session establishment request message includes UE information related to establishment of a user plane connection for collecting UE data based on a request to establish the user plane connection from the SMF, receiving, from the SMF, a PDU session establishment accept message in response to the PDU session establishment request message;

receiving, from the SMF, a NAS (Non-Access-Stratum) message including information related to a request to establish the user plane connection for collecting UE data, based on the UE information and the request to establish the user plane connection;

performing to establish the user plane connection with AF (application function), based on the request to establish the user plane connection for collecting UE data.

6. The method of claim 5, performing to form the user plane connection with the AF before receiving the NAS message, based on the PDU session establishment accept message not including SMF information that the SMF supports requesting the UE to establish the user the plane connection.

7. A UE (User Equipment) to perform wireless communication, comprising:

a transceiver; and a processor, wherein the processor performs operation comprising:

transmitting, to a SMF (Session Management Function), a PDU (Protocol Data Unit) session establishment request message, wherein the PDU session establishment request message includes UE information related to establishment of a user plane connection for collecting UE data based on a request to establish the user plane connection from the SMF, receiving, from the SMF, a PDU session establishment accept message in response to the PDU session establishment request message;

receiving, from the SMF, a NAS (Non-Access-Stratum) message including information related to a request to establish the user plane connection for collecting UE data, based on the UE information and the request to establish the user plane connection;

performing to establish the user plane connection with AF (application function), based on the request.

* * * * *